(12) United States Patent
Sieracki et al.

(10) Patent No.: US 7,225,548 B2
(45) Date of Patent: Jun. 5, 2007

(54) SYSTEM AND METHOD FOR ALIGNING MULTIPLE SIGHTING DEVICES

(75) Inventors: Jeffrey M. Sieracki, Silver Spring, MD (US); Craig L. Silver, Mt. Airy, MD (US)

(73) Assignee: SR2 Group, LLC, Silver Spring, MD (US)

( * ) Notice: Subject to any disclaimer, the term of this patent is extended or adjusted under 35 U.S.C. 154(b) by 0 days.

(21) Appl. No.: 11/130,225

(22) Filed: May 17, 2005

(65) Prior Publication Data

US 2006/0010697 A1 Jan. 19, 2006

Related U.S. Application Data

(60) Provisional application No. 60/571,913, filed on May 17, 2004.

(51) Int. Cl.
*G01C 15/00* (2006.01)
(52) U.S. Cl. .......................................... 33/267; 33/286
(58) Field of Classification Search ................ 33/1 CC, 33/267, 276, 277, 278, 280, 286
See application file for complete search history.

(56) References Cited

U.S. PATENT DOCUMENTS

| | | | |
|---|---|---|---|
| 3,777,305 A | 12/1973 | Stoutmeyer | |
| 4,012,989 A | 3/1977 | Hunt et al. | |
| 4,021,830 A | 5/1977 | Kanno | |
| 4,097,155 A | 6/1978 | Appert | |
| 4,202,246 A | 5/1980 | Schertz et al. | |
| 4,274,149 A | 6/1981 | Flanagan | |
| 4,669,809 A | 6/1987 | Patry et al. | |
| 4,722,601 A | 2/1988 | McFarlane | |
| 5,008,543 A | 4/1991 | Bertrand et al. | |
| 5,245,909 A | 9/1993 | Corrigan et al. | |
| 5,267,143 A | 11/1993 | Pryor | |
| 5,347,910 A | 9/1994 | Avila et al. | |
| 5,436,542 A | 7/1995 | Petelin et al. | |
| 5,764,344 A | 6/1998 | Taniguchi | |
| 6,202,535 B1 | 3/2001 | Alhadef et al. | |
| 2005/0005463 A1* | 1/2005 | O'Mahony et al. | 33/286 |
| 2005/0188555 A1* | 9/2005 | Hung | 33/286 |

\* cited by examiner

*Primary Examiner*—G. Bradley Bennett
(74) *Attorney, Agent, or Firm*—Rosenberg, Klein & Lee

(57) ABSTRACT

A system of independently oriented sighting devices includes a first sighting device (120) and a second sighting device (110). Upon aligning a line of sight of the first sighting device (12) with a target object (130), the first sighting device transmits a reference signal over a communications link (140). The second sighting device (110) determines its orientation in space relative to the orientation of the first sighting device (120) from characteristics of the reference signal. Thus, absolute coordinates of the target object (130) need not be known by the second sighting device (110) nor is it required that they be transmitted by the first sighting device (120). The user (115) of the second sighting device is directed to rotate the second sighting device (110) towards the target object (130) via feedback through guidance indicators located in a viewing port (250) thereof.

55 Claims, 17 Drawing Sheets

SYSTEM AND METHOD FOR ALIGNING MULTIPLE SIGHTING DEVICES

RELATED APPLICATION INFORMATION

This Application is based on U.S. Provisional Patent Application Ser. No. 60/571,913, filed on 17 May 2004.

BACKGROUND OF THE INVENTION

1. Field of the Invention

The present invention most directly relates to alignment of two or more directional devices, and more particularly, to alignment of sighting devices. The invention further relates specifically to dynamically aligning sighting devices to allow two or more users to easily locate a common target object through independently translated viewing ports.

2. Description of the Prior Art

Sighting devices, particularly optical sighting devices, are used in many applications and are varied in configuration. Common optical sighting devices include, but are by no means limited to, binoculars, telescopes, rifle and other weapon sights, and surveying equipment. A user might sight through an optical device, generally, to (a) magnify or otherwise improve viewing of a target in the visual field and/or (b) to align an attached piece of equipment (e.g., rifle, survey tool, etc.) with a target.

In certain sighting applications, situations arise in which two or more users working together need to share information about target location so that both may view the same scene. For example, a bird watcher may wish to convey the location of a bird to a second bird watcher so that they both can focus quickly on the same bird. As a further example, one party equipped with a wide field optical device may wish to guide a second party equipped with a high power, narrow field optical sight towards a target object. Sighting applications in which it is desirable to share information between users also include tree and geologic identification, ship and terrain spotting at sea, aircraft spotting and identification, and military targeting, such as when a spotter with one optical device guides a second person equipped with an optically sighted weapon towards a specified target.

Communication between sighting device users is often in the form of haphazard directional descriptions, such as, "Two o'clock, a few degrees above the horizon," or, "A little below the top branch of the tall forked tree." Previous solutions to this shortcoming have included providing internal compass and declinometer readings in the displays of prior art sighting devices. Through such a display, users may communicate direction using precise numbers to co-ordinate their targeting. Other devices of the prior art have implemented detection of rotation via gyroscopically stabilized platforms, thereby subsequently conveying directional information to a remote user. This latter method, however, requires an initial coordinate alignment step to synchronize the two devices, which may preclude certain spontaneous operations.

An effort to overcome some of the shortcomings addressed above, while demonstrating other shortcomings, is disclosed in U.S. Pat. No. 5,764,344 issued to Taniguchi. The reference discloses an observing apparatus for simultaneous viewing of an object by two different users. A first operator locates a target through a first telescope and depresses a detection switch when the target is adequately framed in his field of view. An arithmetic control unit, upon notification that the detection switch has been activated, determines the distance from the first telescope to the target as well as a set of coordinates of the target. The coordinates are subsequently transmitted over a cable to a second telescope under the control of a second operator. At the second telescope, an arithmetic control unit activates indicators in the viewing field of the second operator, which specify to the second operator a direction of rotation through which the second telescope must be rotated in order for the target to be framed in the field of view of the second telescope.

While the visual feedback provided to the second operator directing her towards the location of the target ameliorates verbal direction commands such as those discussed above, several deficiencies of the Taniguchi system limit its range of applicability. First, the referenced system utilizes an absolute frame of reference, i.e., both telescopes are configured, via rotational encoders, to locate a point in a previously established coordinate system. Establishing the coordinate system is an involved process, as disclosed in the reference, involving calibrating both telescope platforms on a previously designated calibration target. Ironically, both operators must locate the same calibration target in their respective fields of view, which is the target location problem alleviated by the present invention. The Taniguchi system, though, first requires that the telescopes be collocated for a first calibration measurement prior to moving the second telescope to a remote location, where the second operator must once again locate the calibration target and make a second calibration measurement. The two telescopes then remain fixed in their respective locations for the duration of ordinary viewing operations, as the invention does not provide a means to dynamically recalibrate if one or the other user relocates.

A further shortcoming of the Taniguchi system lies in its means for determining the absolute bearing in the chosen coordinate system. The embodiments disclosed by the reference utilize rotational encoders on respective, fixed tripods of equal length. The tripod serves to fix the telescopes within the coordinate system and provides a non-rotating reference base for the rotational encoders. It should be apparent to the skilled observer that such a system severely restricts the movement of its users.

However, rotational encoders are not the only means by which absolute bearing may be determined. Other bearing sensors include magnetic compasses, which are known to be affected indeterminately by local magnetic disturbances, such as metal objects and electronic equipment. Rotational accelerometers are also capable of providing an absolute bearing, but are subject to drift. Neither of these devices can provide consistent reliable accuracy for aligning optical systems having magnification.

Certain military and camera devices utilize an instrument or weapon that is slaved to automatically move in response to adjustments in a remote optical sight. The mechanically slaved techniques of the prior art often rely on fixed spatial relationships and pre-alignment to solve the problem of common targeting. While duplicating, or even translating, the movement of one device through pointing movements of another device is both well-known and useful, the technique can be limiting in other sighting applications. For example, in certain applications, users should be allowed to aim their respective sighting equipment freely and independently of the aim of other sighting devices, until such time as one user wishes to direct another to view a common target object. At that time, communicating alignment information between users is warranted. Even then, a user may wish to ignore the sightings of other users and continue aiming his own equipment independently, a option that would not be possible in systems practicing the mechanical slaving techniques of the prior art.

In light of the shortcomings of the prior art, there is an apparent need for sighting devices that are operable to communicate alignment between two or more passively aimed devices.

SUMMARY OF THE INVENTION

In one aspect of the present invention, a system is provided for aligning independently oriented sighting devices toward a common target object. The system includes a first sighting device having a first sighting axis and a transmitter for transmitting a reference signal once the first sighting axis is aligned on the common target object. A second sighting device having a second sighting axis is provided in the system, which includes a receiver for receiving the reference signal transmitted from the first sighting device. The second sighting device includes a processing unit coupled to the receiver for determining from a characteristic of the reference signal a relative orientation in space of the second sighting device with respect to an orientation in space of the first sighting device. The second sighting device also includes an indicator coupled to the processing unit for indicating a direction in which to direct the sighting axis of the second sighting device so as to be aligned on the common target object.

In another aspect of the invention, a system is provided for aligning independently oriented sighting devices toward a common target object, where a first sighting device having a first sighting axis includes a transmitter for transmitting a reference signal when the first sighting axis is aligned on the common target object. A second sighting device having a second sighting axis is provided, which includes a processing unit for determining an orientation in space of the second sighting device with respect to an orientation in space of the first sighting device. The second sighting device also includes at least one orientation sensor for determining its orientation within a corresponding single plane of space relative to a predetermined orientation in the same corresponding single plane. The at least one orientation sensor is coupled to the processing unit and provides a signal thereto responsive to its relative orientation in the corresponding plane. The second sighting device further includes a receiver for receiving the reference signal from the first sighting device, where the receiver is also coupled to the processing unit. The receiver provides a signal to the processing unit corresponding to an orientation of the second sighting device in at least one plane in space relative to the orientation in the at least one plane of the first sighting device. The receiver signal is responsive to a characteristic of the reference signal corresponding to the orientation of said second sighting device in the at least one plane in space relative to the orientation in the at least one plane of said first sighting device. The processing unit determines from the receiver signal and from the signal from the at least one orientation sensor a relative orientation in space of the second sighting device with respect to an orientation in space of said first sighting device. The second sighting device also includes an indicator coupled to the processing unit for indicating a direction in which to direct the second sighting axis so as to be aligned on the common target object.

In yet another aspect of the invention, a method is provided for directing respective sighting axes of independent sighting devices towards a common target object. A first sighting device is operable by a first user to be oriented in space. The first sighting device has a first sighting axis and a transmitter for transmitting a reference signal. A second sighting device is operable by a second user to be oriented in space independently of said orientation in space of said first sighting device. The second sighting device has a second sighting axis and includes a receiver for receiving the reference signal. The second sighting device also includes an indicator for indicating to the second user an adjustment direction to apply to the orientation of the second sighting device. Once the first sighting axis is aligned on the target object, the reference signal is transmitted, whereupon it is subsequently received at the receiver. At the second sighting device, a characteristic of the reference signal is acquired, which is used to determine a relative orientation in space of the second sighting device with respect to the first sighting device. An orientation correction is determined from the relative orientation of the second sighting device and the user of thereof is provided with an indication of the orientation correction via the indicator so as to direct the second sighting axis towards the target object.

DETAILED DESCRIPTION OF PREFERRED EMBODIMENTS

Figure 1:
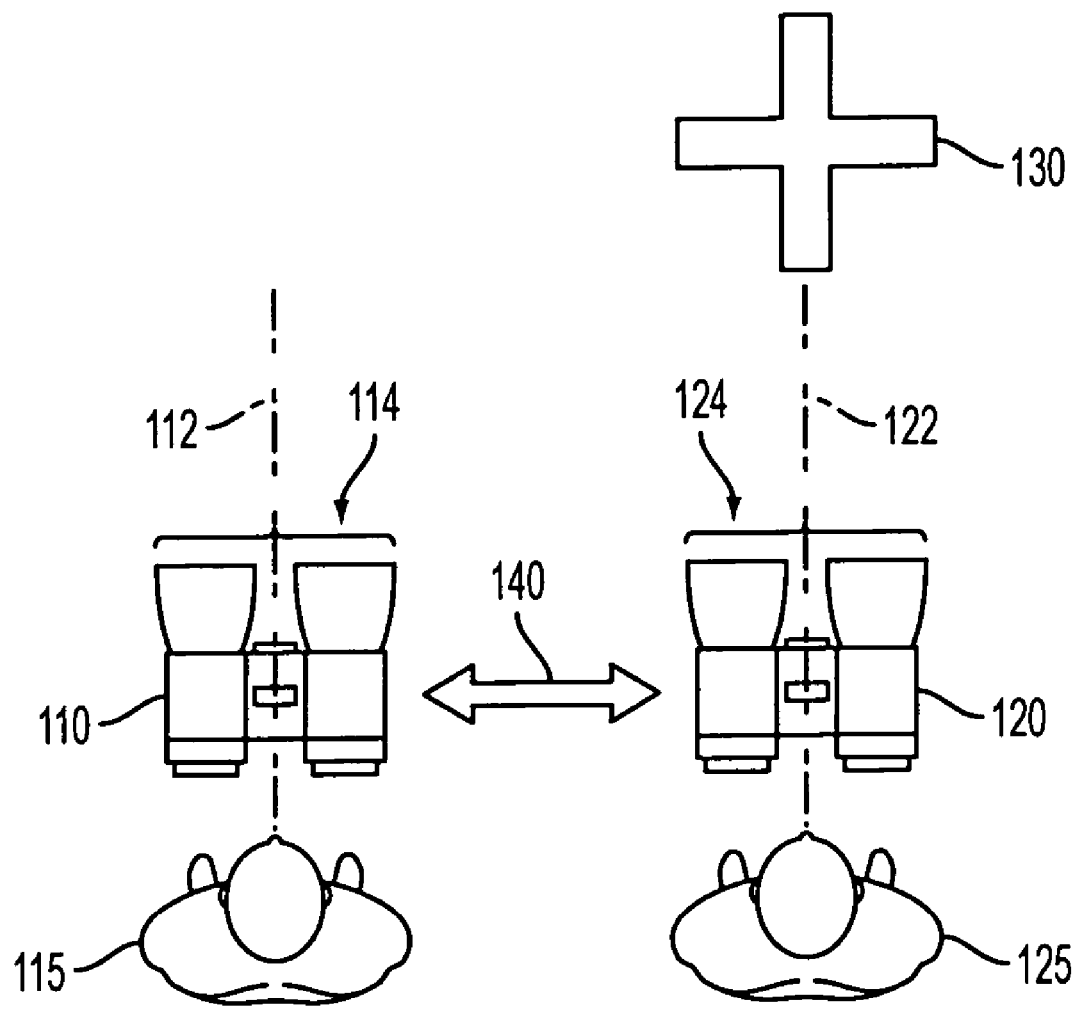
FIG. 1 is a schematic representation of a system of sighting devices according to the present invention.

For purposes of explanation of the inventive concept, a basic configuration of fundamental components of the present invention is broadly illustrated in FIG. 1. As is shown in the Figure, two sighting devices, 110 and 120 are in use by two separate users 115 and 125, respectively. Whereas, the sighting devices are illustrated schematically in the Figure as optical sighting devices, particularly binoculars, any sighting device may be substituted for either or both of 110 or 120 with no material change in the operation of the invention. Moreover, the sighting devices need not be configured for operation at optical wavelengths; the term "sighting device" as used herein will refer to a directive device in which a primary receiving aperture, such as is generally shown at 114 and 124 of FIG. 1, is to be pointed or aimed at a target object. The exemplary embodiments, for purposes of description, will be optical sighting devices such as binoculars, telescopes, spotting scopes, rifle scopes, and weapons sights, but it should be apparent to the skilled artisan that other directive devices such as microphones and antennas may be used in accordance with the present invention. Moreover, it should be noted that sighting devices used in a particular application need not be of the same type. For example, in certain applications, one sighting device may be binoculars and another sighting device may be a directional microphone. A user may, for example, align the binoculars on a bird in a bird watching application and then subsequently wish to record the bird's song via the directional microphone. Through the present invention, the user of the binoculars may direct a user of the microphone to aim the microphone towards the target bird so as to be co-aligned therewith. The implementation of such useful embodiments will become clear through the various descriptions given below.

As shown in FIG. 1, the first user 125 has oriented sighting device 120 in space so that the sighting axis 122 thereof is aligned on a selected target object 130. As will be discussed further below, sighting device 120 is furnished with means for alignment on the target 130, such as a viewing port for establishing visual contact therewith. Additionally, sighting device 120 has installed thereon means for transmitting a reference signal, which is transmitted via one or more transmission channels 140 to the second sighting device 110. In certain embodiments of the present invention, the reference signal may be continuously or periodically transmitted while in other embodiments, one or the other of users 115 or 125 will establish the transmission channel 140 using some appropriate means, such as a switch or button, on their respective sighting devices 1110, 120.

Typically, one of optical sighting devices 110, 120 will act as a master or transmitter while the other will act as a slave or receiver. It is to be noted that the terms "master" and "slave" are used to distinguish a transmitting sighting device from a receiving device, respectively, and are not used to imply that the orientation of one sighting device is responsive to the orientation or movement of the other. Indeed, it is a principle objective of the present invention to allow co-alignment of sighting devices that are independently oriented in space, such as hand-held binoculars, respectively operated by independent users. As such, the roles of master and slave may be respectively fixed in certain embodiments and in other embodiments, the roles may be reversible. In certain other embodiments, each unit may simultaneously transmit and receive reference information by means of non-interfering transmissions.

For purposes of the present invention, the transmitted reference signal need only possess a characteristic sufficient for the receiving sighting device to determine its orientation in space relative to that of the transmitting sighting device. Such characteristics include, but are not limited to, time-of-flight of a pulse of a pulse modulated carrier wave, a phase relationship over several reference signal receiving apertures distributed on the receiving device and a polarization state of a carrier wave. However, certain portions of the reference signal may be designated to carry information-bearing data, such as through binary data encoded on a radio transmission, and may include absolute references, such as compass heading and declination, or relative information, such as rotational accelerometer outputs. In certain other embodiments, the reference signal carries no encoded data and the relative orientation between devices is determined by the characteristic of the reference signal waveform. Examples of both configurations are discussed further in paragraphs that follow.

The reference signal transmission may be transmitted directly from one sighting device to another or may be reflected from the target 130. Exemplary embodiments of each of these orientation methods are discussed in further detail below. It is further contemplated within the scope of the invention that additional data, for purposes unrelated to relative orientation determination, may also be transmitted between devices.

Whereas, only two users 115 and 125 respectively operating two sighting devices 110 and 120 are shown in FIG. 1, any number of devices may participate as receivers in such a system and remain within the scope of the invention. Typically, only one master or transmitting user will send a reference signal at any given time, while any number of receiving units may receive the reference signal so as to align with the target object selected by the user of the master device. However, by utilizing any of the non-interfering transmission techniques known well in the communication art, e.g., duplex communications, time-division multiple access (TDMA), or code-division multiple access (CDMA), certain embodiments of the invention may allow multiple users to simultaneously exchange reference data. In some general applications, a receiving sighting device will be oriented in accordance with only one transmitted reference signal at any give time. However, it is within the scope of the invention that a receiving sighting device could integrate signals from two or more simultaneously transmitting source devices by parallel processing of reference signals, each reference signal being processed in accordance with the present invention as demonstrated through the exemplary embodiments.

In certain embodiments of the invention, the transmission channel 140 may be over a mechanically constrained or guided media, such as an electrical cable or optical fiber. Such a link, although possibly limiting the relative mobility of users, may be advantageous certain applications, such as in noisy environments and in applications where stealth requirements dictate carefully restricted energy transmission. However, since a large number of sighting device users generally value un-tethered freedom of movement, many useful embodiments of the present invention utilize one or more well-known wireless methods, such as radio frequency transmissions, ultrasonic or audio transmissions, and infra red or optical transmissions. Details of the implementation of wireless reference signal transmission methods are described below in certain exemplary embodiments and other similar implementations will be obvious to those skilled in the art.

Referring once again to FIG. 1, a generalized description of the operation of the illustrated embodiment of the present invention is now given. User 120 aligns the sighting axis 122 of sighting device 125 so that the primary receiving aperture 124 is directed towards, and preferably centered on the target 130. User 120 establishes one or more transmission channels 140, such as by depressing an indicator switch (not shown), and transmits the reference signal. Sighting device 110 receives the reference signal and processes it accordingly so as to obtain a relative orientation between devices 110 and 120. User 115 is directed via feedback means (not shown in FIG. 1) to direct the primary receiving aperture 114 of sighting device 110 towards the target object 130. The respective fields of view of sighting device 120 and sighting device 110 converge on the same target object 130 when the respective sighting axes 122 and 112 are aligned thereon.

Certain embodiments of the invention may include means by which to adjust the relative orientations of sighting devices 110 and 120 to compensate for parallax so that the target 130 is better centered in the respective fields of view thereof. However, since many optical sighting devices are typically employed to view distant objects, and users wishing to share viewing information will often be relatively close to each other in comparison to the distance to the target, parallax correction may be optionally omitted as a measure of reducing costs for a basic model of the invention in the marketplace. A description of an exemplary parallax correction method is given below.

Referring to FIGS. 2A–2D, there is shown exemplary displays for conveying orientation correction via visual feedback methods in accordance with certain embodiments of the present invention. In the illustrated exemplary embodiments, the visual feedback is provided via the viewing port of an optical sighting device, such as binocular 110 of FIG. 1, to direct the aim of the second user 115. The term "viewing port" is used herein as the aperture through which a user sights a target object. In certain embodiments of the present invention, such as when implemented on many optical sighting devices, the viewing port coincides with the primary receiving aperture, i.e., the aperture for which alignment with the target object is primarily desired. However, in certain other embodiments, such as when the primary receiving aperture is not an optical port, the viewing port may be removed therefrom. For example, a directive listening microphone, such as is known in the art to include a microphone positioned at the focus of a parabolic dish, may be a primary receiving aperture on which a separate target viewing mechanism, such as a CCD camera, is installed for purposes of aiming at a target. A separate viewing port, such as a video display device, may be coupled to, but removed from, the viewing mechanism, to provide visual feedback to a user for purposes of aligning his microphone on a target common to a remote user of a similarly adapted microphone. It will be apparent to those skilled in the art how such configuration is consistent with the present invention in light of the detailed descriptions of the exemplary embodiments provided herein.

In the examples of FIGS. 2A–2D, a bird 210 provides a target object, which is already partially visible in the visual field 250 of the viewing port of a slave sighting device. The crosshairs 260 indicate the center of the visual field for purposes of reference in this discussion. Actual crosshairs are optional and are not necessary to implement the invention, but may be included in certain embodiments to assist the user in centering the visual field 250 on the target object 210. Crosshairs 260 may take any of a numerous of forms known to those skilled in the art.

There are many analog and digital means for displaying information in the visual field of a viewing port of an optical device that are suitable for use with the present invention. Indicators may be installed in the viewing port so as to be observed directly, such as is disclosed in U.S. Pat. No. 4,274,149, issued to Flanagan. The use of prisms and other optical elements to project information into a viewing port is also well known, such as disclosed by U.S. Pat. No. 4,021,830, issued to Kanno, and may be used in implementing the present invention. The actual means for providing the visual feedback described with reference to FIGS. 2A–2D may be carried out by various electronic, optical or digital imaging methodologies without deviating from the intended scope of the present invention.

Figure 2A:
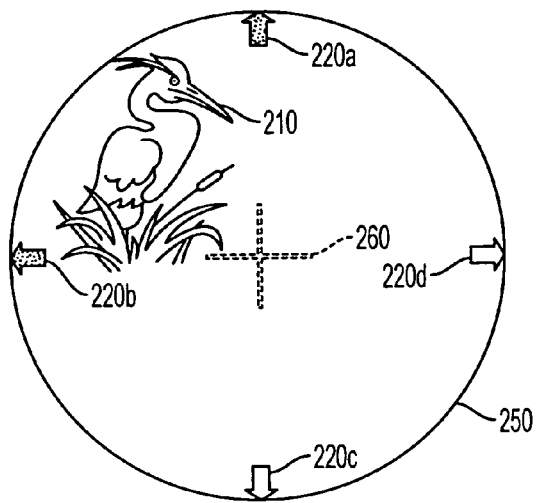
FIGS. 2A–2D are illustrations of visual feedback indicators for guiding an operator towards a target object in accordance with the present invention.

Referring to FIG. 2A, directional indicators 220a–220d are selectively illuminated in accordance with the present invention to indicate to the user in which of four directions the user should adjust her aim. In the illustrated example of the Figure, upper indicator 220a and left indicator 220b are illuminated, thus advising the user to adjust her aim up and to the left. It should be clear to the skilled artisan that other indicator styles may easily be employed without departing from the scope of the present invention. For example the four indicators 220a–220d may be supplemented by any number of additional indicators; darkening of the indicators may replace illumination thereof; the arrows illustrated may be replaced by bars or other shapes; and so on. Additionally, some indication of being "on-target" may be required in certain applications. Hence, many embodiments of the present invention may include a display in the visual field 250 that changes in a recognizable way upon reaching an on-target state, such as by flashing or illuminating all four indicators 220a–220d or illuminating the crosshairs 260.

Figure 2B:
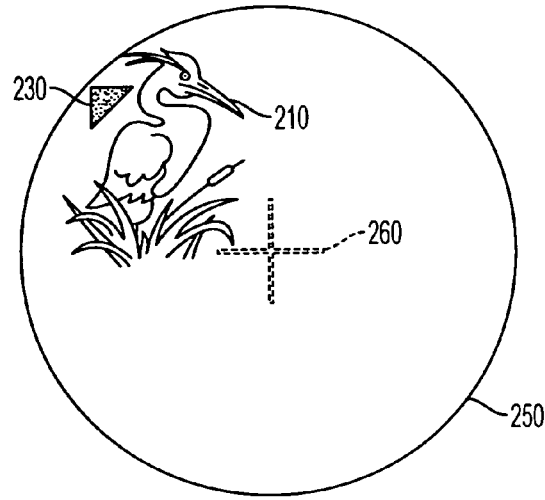

FIG. 2B illustrates a further embodiment of the visual feedback display. The user is directed to change aim up and to the left by the presence of a radial arrowhead 230. The arrowhead 230 may be a member of an array of discrete indicators, such as implemented by liquid crystal displays, or may be placed on a continuum, such as by any number of analog means including well-known cathode ray tube based visual displays.

Figure 2C:
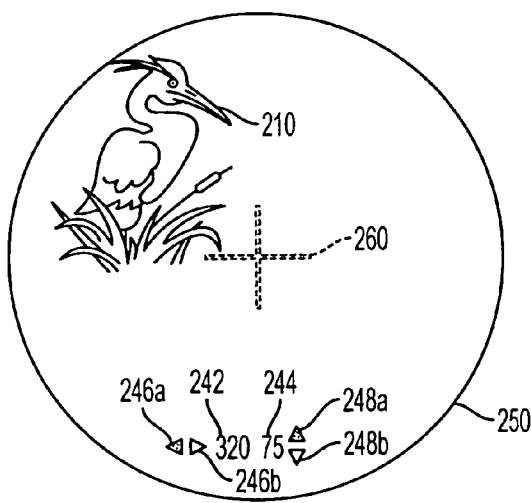

FIG. 2C illustrates another exemplary embodiment for which absolute reference information has been transmitted from one or more sighting devices. The information is processed in accordance with certain aspects of the present invention, as will be described below, and is displayed in the visual field 250. As shown in the Figure, the compass heading 242 and elevation 244 defining the bearing of user's sighting device is indicated in the visual field 250 using digital numbers. The user is directed to change aim up and to the left by the illumination of arrows 248a and 246a, respectively, while arrows 248b and 246b remain deactivated. Many similar, functionally equivalent display variations will be obvious to those skilled in the art.

Figure 2D:
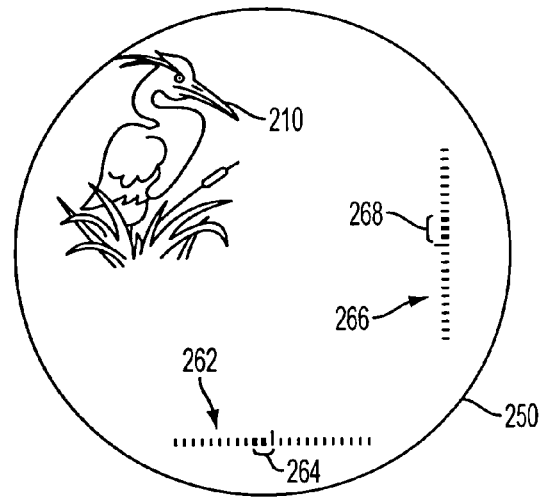

FIG. 2D illustrates yet another embodiment of an exemplary visual feedback display. To exemplify aspects of the variability of the display, the embodiment omits the crosshairs 260 shown in FIGS. 2A–2C. The user may locate the center point of the visual field 250 by referencing the center of the tick ranges 262 and 266 on the bottom and right of the visual field 250, respectively. The illustrated embodiment implements a so-called "digital analog" display to provide the user information regarding both direction and a measure of degree as to how far the bearing of the sighting device must be adjusted to locate the target object selected by the transmitting sighting device. Ticks 264 and 268 are illuminated, or alternatively darkened, in proportion to the aim correction required, from none to the maximum span of the visual scales 262 and 266. In the example shown, the user is directed to change aim up and to the left by relatively small amounts to achieve centering the target 210 in the visual field 250.

Numerous other variations of feedback visualization methods will be obvious to those skilled in the art. Those shown in the Figures are intended to serve as exemplary embodiments demonstrating various aspects of the invention. The illustrated embodiments are neither exhaustive in representing the broad variability of display configurations useable with the present invention nor are they limiting to the scope thereof. Indeed, even non-visual methods of feedback for purposes of directing a user's aim to a target, such as through audible tones, may be implemented.

It should be noted that in certain embodiments of the invention, users need not have any visual means of sighting the target. For example, the master device may be aligned on the target by non-visual means and the slave device may be directed toward the target by following directional indicators without actual visual contact with the target. Indeed, many useful embodiments of the invention are intended for use in aligning systems of high magnification or high directivity where the target is not in the field of view of the sighting device until it is essentially aligned thereon. The user will typically attend to directional indicators during the alignment operation of such embodiments of the invention without visual contact with target. Thus, the overlay of the visual indicators in the viewing port of a sighting device is not a requirement of the invention. The indicators may be located elsewhere, while still providing the directional feedback to the user. To extend this idea to an exemplary embodiment, the directional microphone discussed above may be considered. In exemplary embodiments, the indicators thereof may be implemented by a plurality of, for example, light emitting diodes located on a portion of the parabolic dish far removed from the sighting axis of the device. Still, the indicators may be configured to direct the user towards the target object selected by the master device in accordance with the present invention.

Figure 3:
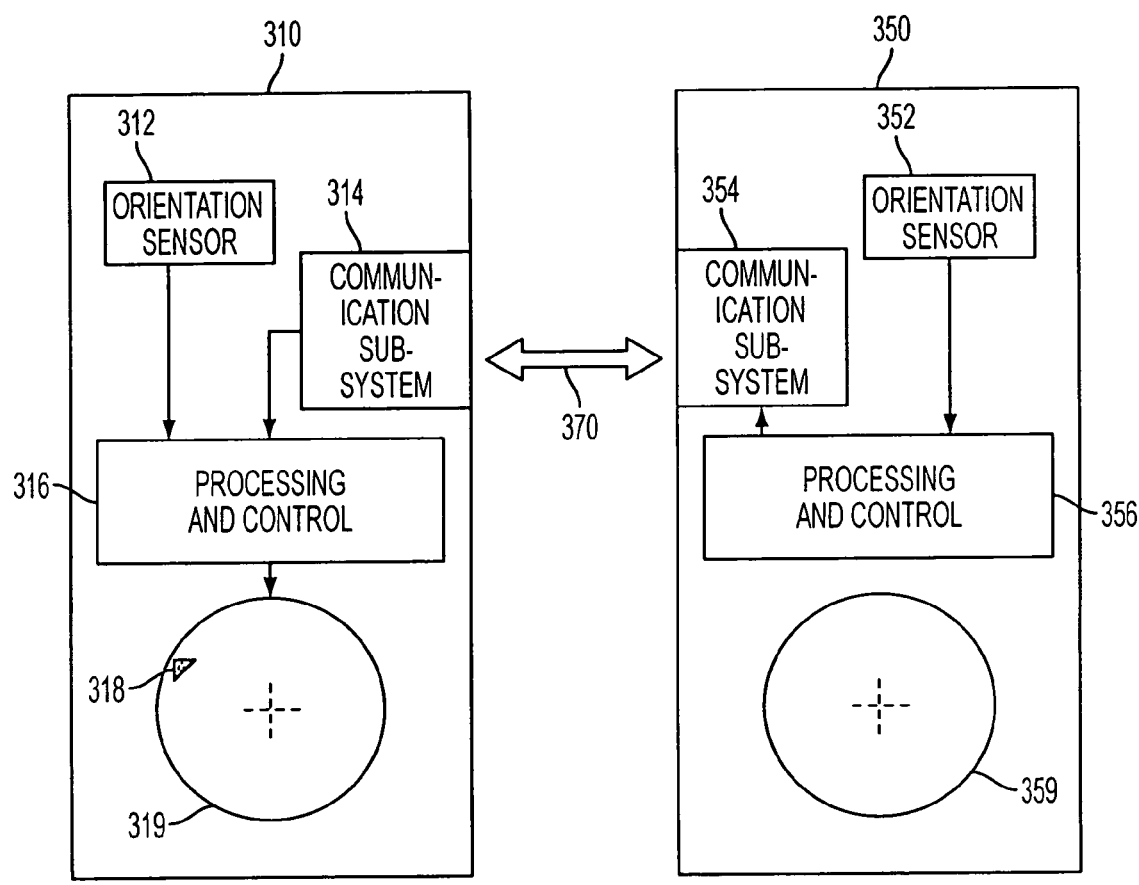
FIG. 3 is a system block diagram of an alignment system in accordance with the present invention.

Referring now to FIG. 3, there is shown a functional block diagram of fundamental components of an exemplary system implementing the present invention. Separate sighting devices are shown at 310 and 350. In certain embodiments, both sighting devices 310 and 350 include the same functional elements and can each operate in both master and slave modes. For purposes of explanation, the following discussion assumes sighting device 310 to be a slave device to sighting device 350, which is designated as the master device. In this configuration, information would flow in the direction of the arrows illustrated in the Figure.

Orientation sensors 312 and 352 provide reference data to their respective processing and control circuits 316 and 356. Since device 350 is assumed to be the master device, it is thereby also assumed to be oriented on target. Thus, the reference signal of sighting device 350, as determined by processes executed in processing and control circuit 356, is designated as the reference for both systems 350 and 310. Once processed for transmission by processing and control circuit 356, the reference signal is conveyed via communication subsystem 354 to the counterpart subsystem 314 of sighting device 310. Transmission channel 370 is shown as bi-directional since information may, in certain embodiments, be permitted to flow in both directions. However, the purpose of the link 370 is to provide processing and control circuit 316 with sufficient information so as to determine relative physical orientation of sighting device 310 to sighting device 350. Processing and control circuit 316 may combine information from orientation sensor 312 with information communicated over the transmission channel 370. Based upon a comparative analysis of the data from orientation sensor 312 and the reference data provided over the transmission channel 370, processing and control circuit 316 updates a feedback display 319 in a manner consistent with the discussion above. As previously stated, any mechanism that conveys to the user the direction of aim correction required may be substituted for a visual display. It is also to be noted that the counterpart display 359 in the master device 350 is illustrated as being inactive, but it may include active indicators to supply useful information, such as system status. For example, in certain embodiments of the invention, the master device may include an indicator to signal the user thereof when the slave device is aligned with the target object. Obviously, such embodiment would require bidirectional communication capability over transmission channel 370, as contemplated above.

As indicated above, certain embodiments of the invention may assume functionally identical components in both the sending and receiving systems so that they may exchange roles easily. However, such implementation is not necessary; certain embodiments of the invention will be implemented through unilateral sighting devices. Additionally, as discussed above, sighting devices need not be necessarily identically constructed to be compatible. In addition to the examples above, it is further contemplated that one sighting device may utilize a different orientation sensor than the sighting device to which it is to be linked. In any system constructed in accordance with the present invention, both master and slave sighting devices need only communicate and recognize, respectively, the reference signal to the extent that a characteristic thereof or information carried thereby can be processed by orientation determining processes executed by processing and control unit of the sighting device designated as the slave device so as to provide alignment feedback to the user thereof at any given time.

Process and control circuits 316, 356 may be implemented in hardware, software or firmware, or a combination of such in accordance with known technologies. For example, process and control circuits 316, 356 may be a general purpose microprocessor known in the art, which may be coupled to a storage system, such as random access memory (RAM) or read-only memory (ROM). In certain dynamic embodiments, a control program implementing aspects of the present invention and executable on the general purpose processor may be stored in ROM and variable data and computational memory may be provided by RAM, where the ROM and RAM are coupled to the general purpose processor by an appropriate bus. Alternatively, process and control circuits 316, 356 may be implemented as an application specific integrated circuit (ASIC) or as a circuit formed from discrete components.

Communication subsystems 314, 354 will vary considerably based on the specifics of transmission channel 370. In certain embodiments, either of communication subsystems 314, 354 will include a transmitter and the other subsystem 314, 354 will include a receiver, or both subsystems 314, 354 will include both a transmitter and a receiver. Additionally, communications subsystem may include circuitry to encode and decode data transmitted over the transmission channel 370. Exemplary communication modes are demonstrated in the embodiments that follow, but it is to be made clear that any method for communicating the reference information between sighting devices may be used in carrying out the present invention.

In certain embodiments of the invention, the reference signal is divided into various component signals for purposes of conveying sufficient reference information to the slave sighting device. For example, in embodiments described in more detail below, the time-of-flight of a pulse of a modulated waveform requires timing data to be transferred to the slave device. To provide the timing information, the reference signal may be divided into a pulse modulated component, from which the characteristic time-of-flight can be determined, and a data carrying component, which may be used to convey the timing information. The components of the reference signal may be combined and transmitted over a single transmission channel or, alternatively, may be transmitted in separate transmission channels. Such embodiments are useful in implementing the invention when the pulse modulated component is in one form of energy, for example acoustic energy, and the data carrying component is in another form of energy, such as electromagnetic energy. When so embodied, the separate transmission channels may be established in different transmission media, such as air for transmitting the acoustic pulse waveform, and coaxial electrical cable, for transmitting the electromagnetic data carrying component. In any of these and other embodiments, the communication subsystem will include the appropriate means for carrying out the correct transmission of the reference signal over the appropriate number of transmission channels and in the associated transmission media.

Sensors 312 and 352 may utilize any number of widely recognized means to establish the orientation of their respective sighting devices. Exemplary means include encoding compasses and levels and micro-electromechanical systems (MEMS). A dual axis inclinometer for measuring pitch and roll, such as is included in an exemplary embodiment described below, can be constructed by placing two linear MEMS accelerometers at right angles in a plane and so that the relative direction of gravity is measured. These devices establish an absolute reference frame with respect to the surface of the earth. Using such sensors, the heading and elevation angle of device 350, as measured by sensor 352, is decoded by 356 and may be sent via a transmission channel 370 to processing and control unit 316 in the slave device 310. Sensor 312 measures the heading and elevation angle of sighting device 310 and relays these data to processor 316 as well. Processing and control unit 316 then compares the data from each source and determines therefrom the relative correction in bearing required so as to direct sighting device 310 towards the target object. The aim correction feedback is then passed to the user via display 319.

Another exemplary method for determining the orientation of sighting device 310, 350 utilizes known rotational accelerometers as the orientation sensors 312, 352. Numerous electronically readable means to measure rotational acceleration are well known to those skilled in the art. When the invention is so embodied, sensors 312, 352 convey information at an output thereof regarding the orientation of the respective sighting device 310, 350 on two or more axes of rotation. The rotational information is relayed to respective processing and control units 316, 356. An initial known alignment of the two devices is required, after which relative changes in the relative bearing of sighting device 310, 350 may be ascertained and integrated in their respective processing and control unit 316, 356. Changes from the known baseline in device 350 may be transmitted via a transmission channel 370 to processing and control unit 316 of sighting device 310. The comparison analysis is conducted and correction information is again passed to the user via display 319. Variations of this method include the use of an encoding gyroscope as a reference sensor so as to maintain a fixed frame of reference in one or more of the devices 310, 350.

As previously stated, a primary object of the present invention is to provide a system by which the lines of sight of independent sighting devices may be mutually aligned toward a common target object. Certain aspects of the methods of alignment discussed above are reliant on the availability of a global frame of reference. The static reference frame system may be useful in certain applications, but may be excessively resource intensive in other applications. Thus, certain embodiments of the present invention avoid the complications of what essentially amounts to maintaining a coordinate system at each sighting device to navigate in the fixed frame of reference by determining orientation of a sighting device via relative reference frames, i.e., one sighting device determines its orientation with respect to another sighting device without first evaluating its orientation in a static, global frame of reference.

To more easily implement certain relative orientation determining methods, an assumption may be made that the users have some mutual knowledge of or have otherwise conveyed an approximate target direction—at least so far as a visual field hemisphere. Thus, embodiments of the invention may be simplified in construction, but remain useful even if they cannot distinguish alignments that are 180 degrees apart. Because gross aim can be achieved by many complimentary means, many embodiments of the present invention are adapted to distinguish fine differences in alignment rather than to distinguish large differences therein. However, many sophisticated embodiments may include means to ensure that all users are aiming their respective sighting devices in the same direction.

Figure 4:
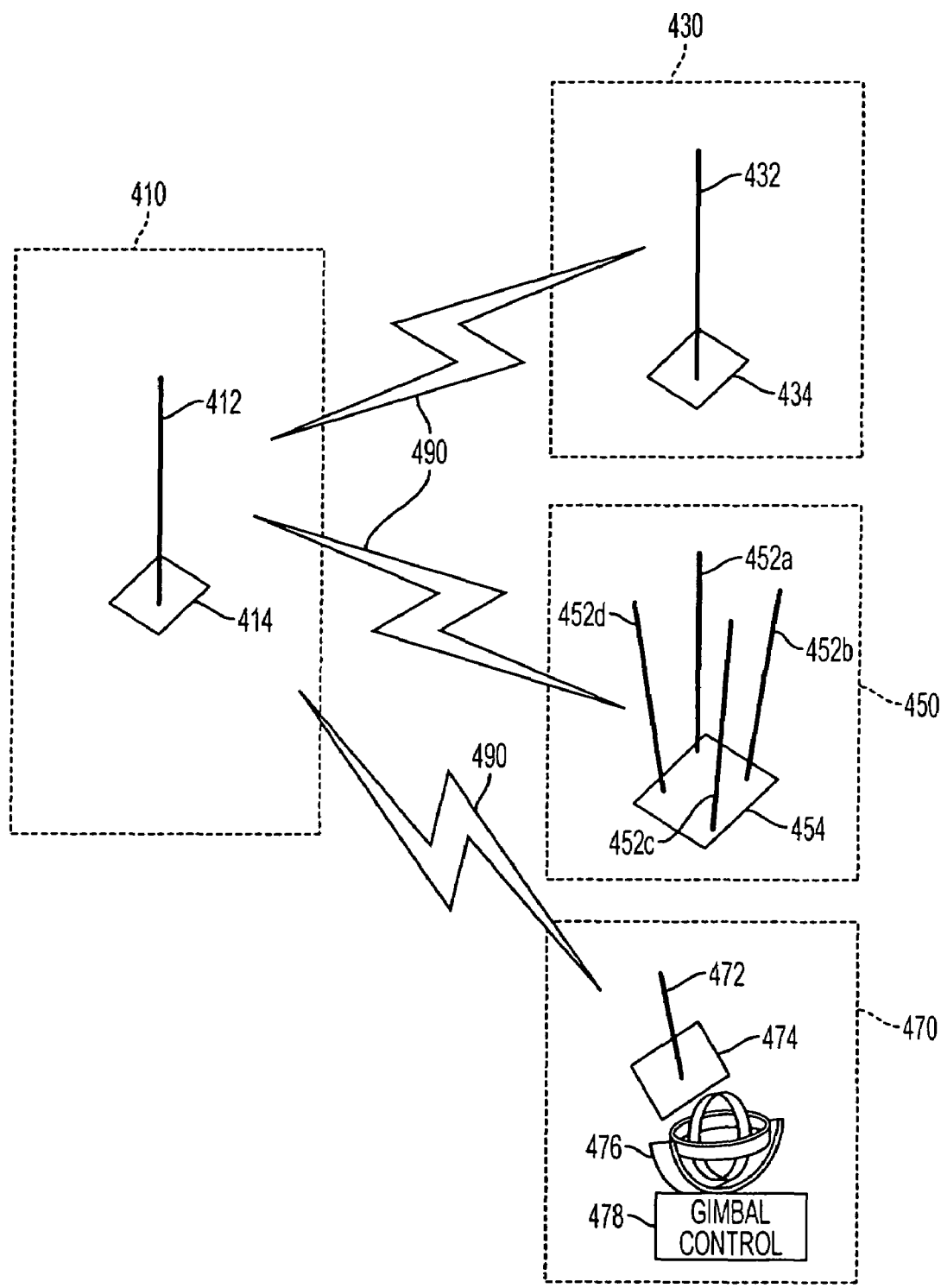
FIG. 4 is a schematic diagram illustrating a radio frequency alignment system in accordance with the present invention.

Referring to FIG. 4, there is shown fundamental components of an exemplary system for determining relative orientation between sighting devices using electromagnetic radiation of, for example radio frequency (RF). Considering first two sighting devices 410 and 430 each having installed thereon an RF antenna 412 and 432, respectively. Each antenna 412, 430 is respectively affixed to a substrate 414 and 434 such that the orientation of the antenna with respect to the sighting device is known. With prudently selected antennas, the RF energy 490 emanates from antenna 412 linearly polarized relative thereto. By judicious antenna design and choice of reference signal characteristics, the signal strength at receiving antenna 432 can be made to be proportional to its alignment with transmitting antenna 412. Of course, the effectiveness of this technique will depend on the distance between antenna 412 and antenna 432, antenna geometry, and wavelength of the transmitted reference signal in accordance with well-known electromagnetic field theory. The two antennas 412, 432 are substantially aligned when a peak in received signal strength is detected at the receiving sighting device 430.

In an alternative embodiment, a plurality of antennas may be arranged on a receiving sighting device, such as is illustrated at device 450. As is shown in the Figure, receiving device 450 includes multiple non-parallel antennas 452a–452d on a fixed substrate 454. The receiving device 450 determines the relative signal strength impinging on antennas 452a–452d to derive a directional adjustment indication. Each antenna in the array will respond according to its relative orientation with the reference antenna 412. Those antennas closer to parallel with the reference axis respond slightly stronger than those less well aligned. For example, if the signal were determined to be strongest at antenna 352*d* when compared with signal strength at the other antennas, then a rotation of the sighting device 450 in that direction would be indicated. In the exemplary array shown, directional feedback is derived from two dimensions of rotation by comparing the signal strength at opposing pairs of antennas. Antenna 352*d* is opposed by 352*b*, and hence, in this example, a subtraction of the signal amplitude at one antenna from that of the other will yield a positive or negative result that would dictate rotation in the plane passing through these antennas, either toward 352*d* or toward 352*b*. When signal strength from all four antennas is balanced, the device 450 is aligned with device 410.

It should be noted that where four antennas are shown in FIG. 4, other numbers may be utilized. Additionally, it is to be noted that while the antennas shown in the Figure are illustrated schematically as dark lines showing their primary orientations, it is done so only to be illustrative of the operation of an exemplary embodiment of the invention. Similar schema based on properties of electromagnetic radiation may be applied via mechanisms other than polarity to form the frame of reference. In other operational modes of alignment, phase differences, Doppler shifts and other directionally dependent measures known in the art may replace the simple single strength model described. Automatic direction finding techniques may also be employed and exemplary embodiments of such are discussed below.

In certain embodiments, an antenna 472 mounted on substrate 474 may be mounted on moveable gimbals 476 and controlled by a feedback circuit 478 as to be operable to seek and align the antenna 472 with antenna 412. The direction required to bring the sighting devices 410, 470 into common orientation toward the target object would be translated from the gimbals feedback circuit 478 by, for example, processing and control unit 316, and displayed on display 319.

Certain limitations may be encountered when implementing the RF alignment technique described above. The exemplary systems previously described are reliant on the maintenance of a polarization state of the transmitted signal across the transmission medium. However, the polarity arriving at a receiving device is highly dependent on the path traversed. Intervening obstructions introduced into the path may cause refraction or reflection of the transmitted radiation, thereby destroying the reference information. Weather, trees, buildings, and even the users' body parts may introduce not only shifts in polarity, but other errors in the electromagnetic reference signal. Thus, many embodiments may put into practice techniques known in the art, such as prudent selection of frequency ranges and well-known phase and error correction procedures, to mitigate the effects of such disturbances.

Figure 5:
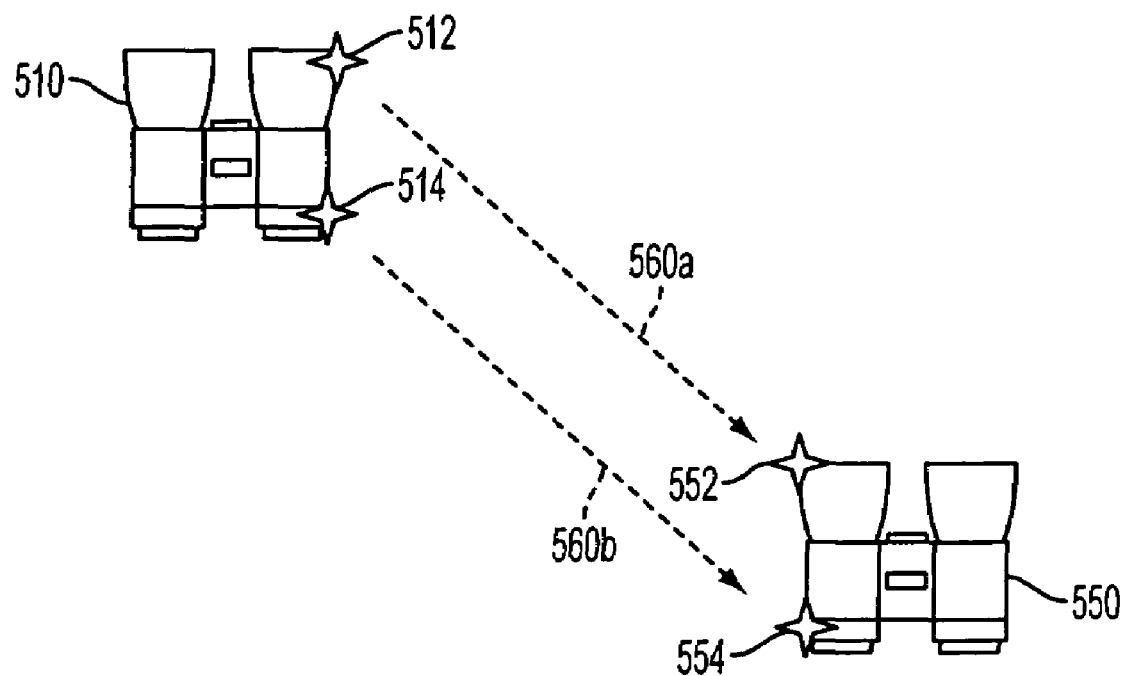
FIG. 5 is a schematic diagram illustrating a multi-sensor timing/phase alignment system in accordance with the present invention.

FIG. 5 illustrates yet another method for aligning sighting devices. Two optical sighting devices 510 and 550 are respectively equipped with a plurality of transmitters 512 and 514 and receivers 552 and 554 at previously established locations on their physical framework. Each transmitter 512, 514 emits a beam of energy serving as the reference signal transmitted over respective transmission channels. Each reference beam is received by one or more of the receivers 552, 554. The energy beams 560*a*, 560*b* may consist of acoustic, ultrasonic, radio frequency, light or any other form of energy that may be transmitted and received in a point-to-point fashion. In the exemplary embodiment illustrated, transmitter 512 emits a component signal 560*a* that is received by receiver 552, while transmitter 514 emits a component signal 560*b* that is received by receiver 554. Alignment between sighting devices 510 and 550 is determined by a distance measurement between each transmitter/receiver pair as either an absolute or relative value. Distance may be determined by a characteristic of the reference signal appropriate to the type of energy beam utilized, including time-of-flight pulse timing and or distributed phase alignment or any by other means known in the art.

For purposes of demonstration, assume transmitters 512 and 514 emit energy pulses synchronously and phase-coherently, i.e., zero phase difference, and are received at their respective receivers 552 and 554. The sighting devices 510, 550 are known to be in alignment only when the pulses are received simultaneously and are in phase. If, for example, a pulse arrives at receiver 552 before it arrives at receiver 554, then it is known that the primary receiving aperture of slave sighting device 550 should be rotated away from that of master sighting device 510 to align on the selected target.

According to aspects of the invention, the reference signal transmissions need not be simultaneous, and may be multidirectional, and may include encoded data that is not necessary for the distance determination function. It is sufficient for aiming in a spatial plane that path lengths between at least two independent points on each of the master and on the slave sighting devices be determined in the geometry defining the alignment of master and slave devices, such is illustrated in the Figure. These measurements are compared to the expected relative path lengths of the aligned state, for example through coincident arrival at multiple receivers of synchronously transmitted energy pulses. These principles are discussed further below with respect to other embodiments involving alignment in three dimensions and rotation in two axes. It should be emphasized that relative rather than absolute path lengths are utilized because the distance between devices, elevation differences, inclination of a sighting axis and any offset of one user in front or behind the otherare unimportant in establishing parallel alignment of sighting axes, such as when mutually sighting a distant target object. However, the geometric factors in multiple orthogonal spatial planes, such as distance between devices, elevation differences, and offset of one user in front or behind the other, may be determined by similar sensor configurations, but are really only necessary for parallax correction, i.e., when the sighting axes of the sighting devices are not expected to be nearly parallel because the target object is close to one or both sighting devices.

Figure 6:
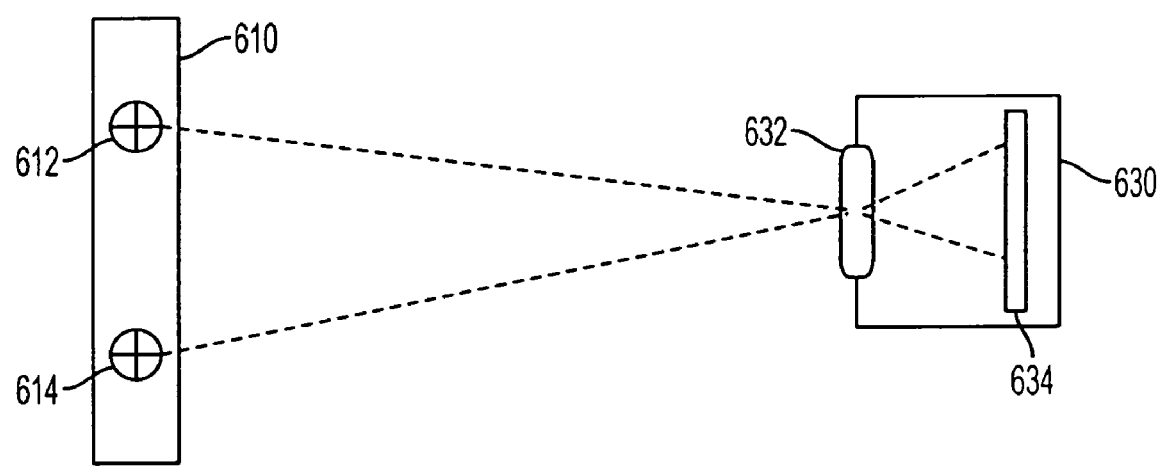
FIG. 6 is a schematic diagram illustrating an image based alignment system in accordance with the present invention.

FIG. 6 depicts a means of determining relative orientation of a remote slave sighting device by angle of incidence of the reference signal based on observing fixed points on its frame. Transmitters 612 and 614 are emissive energy sources mounted on a master sighting device 610. Receiving sighting device 630 includes an entrance aperture appropriate to the energy source, e.g., lens 632, and an array of detectors 634. The array 634 may be linear for two-dimensional alignment or planar for alignment in three dimensions. The detector array 634 may be realized by a charge-coupled device (CCD) known in the art, which are available in both linear and planar configurations. Other simpler arrays may be utilized also, including an array of discrete detectors. Furthermore, whereas the receiver entrance aperture is shown as a single lens 632, a lens system having predetermined optical characteristics may be substituted therefor. The receiver entrance aperture may also be void of any refractive element and may simply be implemented by a pinhole. The entrance aperture may also be replaced by a discrete series of waveguides, such as an optical fiber bundle.

In an alternative embodiment, emitters 612 and 614 may be replaced by separately distinctive passive elements, such as reflectors, which can be imaged onto the detector array 634. In that the elements 612 and 614 may interchanged as either active emitters or passive image objects, they will be referred to in the following discussion as master targets, which is not to be confused with the common target object being observed by both users.

The receiving device 630 determines angles of relative orientation by tracking the master targets 612, 614 across the cells of array detector 634. In embodiments where the master targets are passive images, image detection and recognition techniques known in the art may be utilized to track their movements. In embodiments where the master targets are active emitters, each may be identified by their brightness in certain frequency bands or by modulating their respective emissions so that may be identified and decoded by the detector. An exemplary embodiment of the present invention is implemented by infrared diodes as the master targets 612 and 614 and phototransistors or a CCD sensor array as detector array 634. Each diode 612, 614 may be modulated by respectively unique signatures to that they are distinguishable at the detector 634. The sighting devices 610 and 630 are aligned on the common target object upon detection of a predetermined condition, such as when the signatures of the diodes 612, 614 are measured as equal in optical intensity at the detector 634 or in predetermined relative locations on the detector array 634.

The number of master targets need not be limited to two. However, at least two physically separated master target points are required to determine relative orientation about an axis. Additional master targets can provide additional geometric information about other dimensions of orientation of the slave device 630. If a single master target is used, the device 630 functions as an incident angle detector and can be utilized as described with reference to FIG. 8B. A linear or planar array detector 634 will be most accurate when used to determine orientation in axes perpendicular to its imaging plane. Thus, combining optical information with information derived from a model of the physical geometry of the master device 610 as maintained at the slave device 630, allows the slave sighting device 630 to determine its relative orientation more accurately. Moreover, the depicted mechanism can be combined with time-of-flight or relative phase detection to determine the relative distance of each target point from the sensor. Range may also be triangulated stereoscopically by using multiple sensors on a single frame, or by placing such a sensor on each of the master and slave units and coordinating the data.

Figure 7:
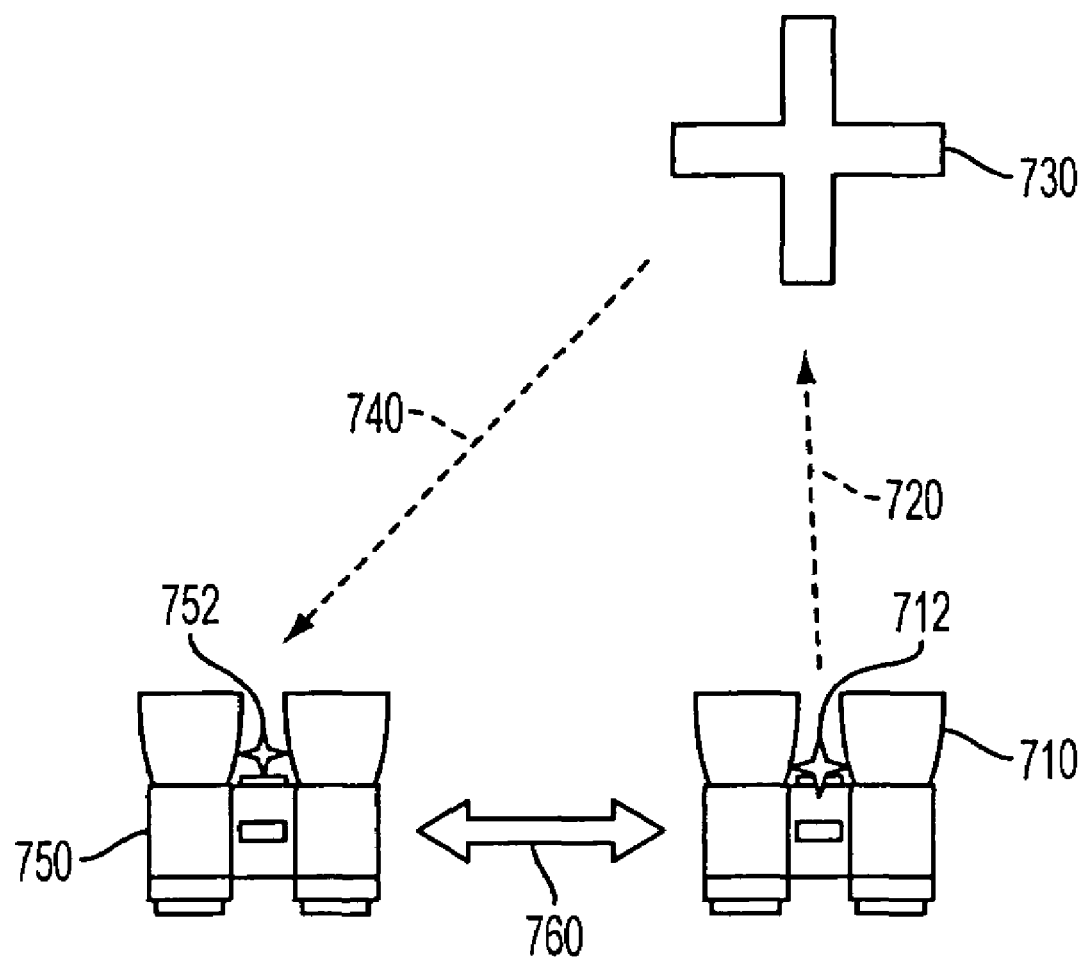
FIG. 7 is a schematic diagram illustrating a target painting alignment method in accordance with the present invention.

Referring to FIG. 7 there is shown yet another alignment method for directing a slave sighting device towards a target being viewed by the user of a master sighting device. The master sighting device 710 is shown approximately focused on target 730. It has an energy-radiating device 712 that emits a tight beam 720 of energy that impinges the target 730. The energy radiated by energy-radiating device 712 may be optical, such as via a laser or an LED, radio frequency, such as by a radio or microwave transmitter, ultra-sonic, or any other energy that can be directed in a tight beam and be at least partially reflected by the target 730. Energy reflected by the target 730 returns in a scattered fashion, some of which will be directed towards an energy-receiving device 752 on the slave sighting device 750.

Receiver 752 is configured to determine the relative direction of incidence of the scattered radiation 740. This may be accomplished through any one of a variety of techniques known in the art, for example by scanning the area in front of sighting device 750 with a highly directional receiver. The scanning operation searches for the direction in which a maximum in signal strength is acquired. The determined angle(s) of incidence provides sufficient information to instruct the user of sighting device 750 to correct his or her aim appropriately. Optionally, the sighting devices 710 and 750 can communicate target location information directly over a communication link 760. It should be noted that illuminating a target with certain forms of energy may not be desirable in certain applications, thus illustrating the beneficial features of the invention, i.e., that the invention may be implemented utilizing a wide variety of energy forms for the reference signal. Other modes of the invention disclosed herein will be preferable in applications such as stealth observation wherein illuminating a target with energy becomes undesirable.

Figure 8A:
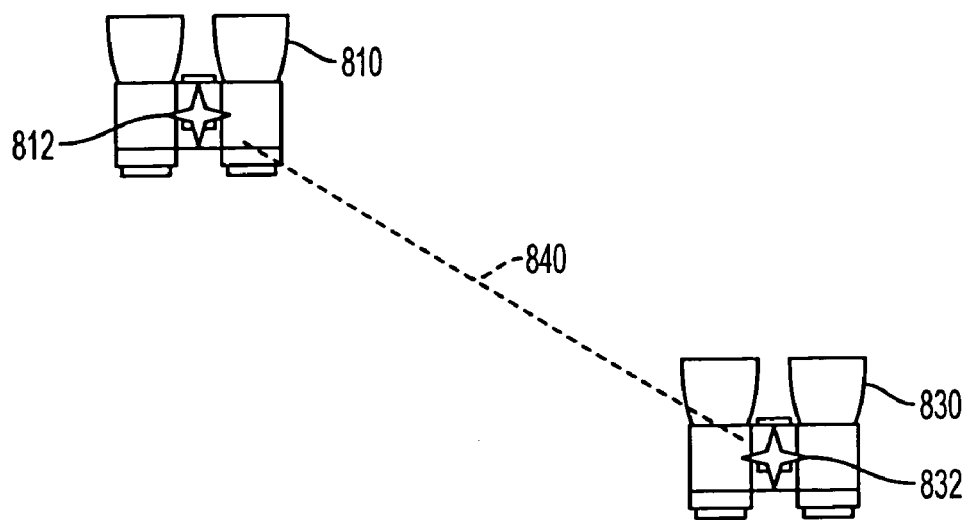
FIGS. 8A–8B are schematic diagrams showing a common reference beam alignment system in accordance with the present invention.
Figure 8B:
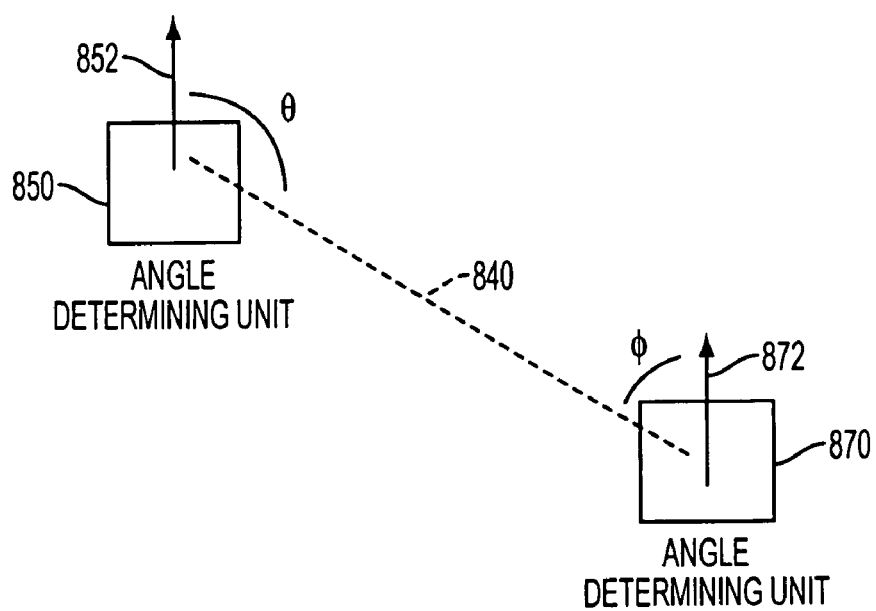

FIGS. 8A–8B illustrate yet another alignment method, based upon automatic direction finding with respect to a common reference beam. Two sighting devices 810 and 830 each contain a means for determining their angle of alignment relative to a common reference beam 840. The reference beam 840 may be conceptualized, and even embodied, as a physical rod or cord stretched tight. In certain useful embodiments, the reference beam 840 will be implemented by energy radiated from one or both of sighting devices 810 and 830 via transmitters 812 and 832, respectively. As in previously described embodiments, the energy beam 840 may consist of acoustic, ultrasonic, radio frequency, light or any other form of energy that may be transmitted and received in such fashion that its radial direction can be determined.

FIG. 8B illustrates components of a system embodied as that of FIG. 8A, further abstracted for purposes of description. Angle determining units 850 and 870 are respectively located on sighting devices 810 and 830 such that angles θ and q) can be determined between reference beam 840 and each of the alignment vectors 852 and 872, respectively. As in previous schematics, the method is only illustrated for a single axis aiming system. To adjust aim on two axes, a second set of angles linearly independent of the first set must be obtained at each end of the beam 840. This may be accomplished, for example, by reference to polarization of the energy, by reference to more than one beam, or by other means for multiple axis direction finding known in the art. It may also be accomplished by combining the determination of orientation relative to the reference beam in one plane, such as the plane shown in the Figure, with a determination of relative orientation with an absolute reference, such as an inclinometer, such as to detect sighting axis inclination and/or to compensate for roll, i.e., rotation about the sighting axis.

Angle determining units 850 and 870 may be configured to measure change in angle (or rotation) as referenced to the framework of the sighting device 810 and 830, respectively. The angle data is conveyed to whichever sighting device is the slave device for purposes of indicating adjustments in aim to the user via the feedback display discussed above. When the slave device is aligned on the selected target, the sum of angles θ and ϕ will be π radians (or 180 degrees), less any parallax compensation as discussed below. The total angle may be smaller, in which case parallax compensation is indicated, as discussed below.

Certain embodiments of the present invention may employ omni-directional radio transmissions at either angle determining unit 850, 870 or both, which may be coupled to an automatic direction finding (ADF) device at angle determining unit 850 or 870 or both. Such equipment may utilize multi-antenna phase differences, Doppler rotations, narrow beam directional search patterns, or any of a host of other methods well known to those skilled in the art. Similarly omni-directional light, acoustic or other energy may be broadcast and its direction interpreted in similar fashion as that used in the radio frequency energy transmission method.

Other exemplary embodiments may utilize directional beams for reference signal 840. For example, a laser coupled with a target feedback system may track angle determining unit 850 from angle determining unit 870, or vice versa. Or a narrow beam radio or optical transmission may also be used, which allows one or both systems 850, 870 to determine angles $\theta$ and $\phi$ from the transmitting direction rather than receiving direction. Reciprocal systems may also be used, such as electronically steerable antennas, which can serve as both transmit and receive apertures.

Figure 9A:
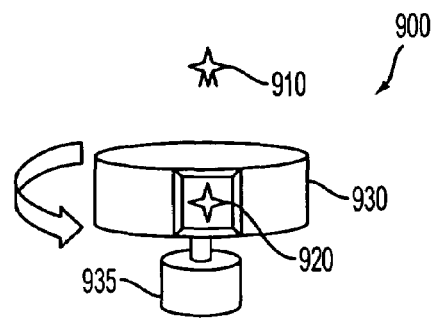
FIGS. 9A–9C are schematic diagrams illustrating an incidence angle determining alignment method in accordance with the present invention.

Referring to FIG. 9A, there is shown an exemplary configuration for a rotating angle determining unit 900. By principles of reciprocity, the unit may be implemented as either a receiver or an emitter, but will be described in an emitting mode. The mechanism 900 comprises a first omni-directional energy source 910, a second energy source 920, a mask 930 or other means for directing the second energy source 920 through swept angles, and a means for moving the directional mask such as an electric motor 935. The mask 930 may be omitted if the energy source 920 is collimated, such as in a laser diode. However, omni-directional sources such as light emitting diodes have advantages of low cost and broad availability. Energy sources 910, 920 may be optical, radio frequency, acoustic, or any other detectable energy that may be masked and/or collimated. The device 900 operates by rotating the mask 930 about the source 920 so that it is swept through angles of up to 360 degrees. Energy source 910 emits an omni-directional energy pulse synchronized with a fixed rotation point of the mask, e.g., zero degrees. A remote detector need only compare the timing of the two apparent pulses in order to determine the angle of emission from the source device 900. However, it should be noted that when the unit is operating in the reciprocal mode, i.e., the mask rotates around a detector, the mask may be coupled to a rotational encoder to determine the angle of the arriving signal.

Figure 9B:
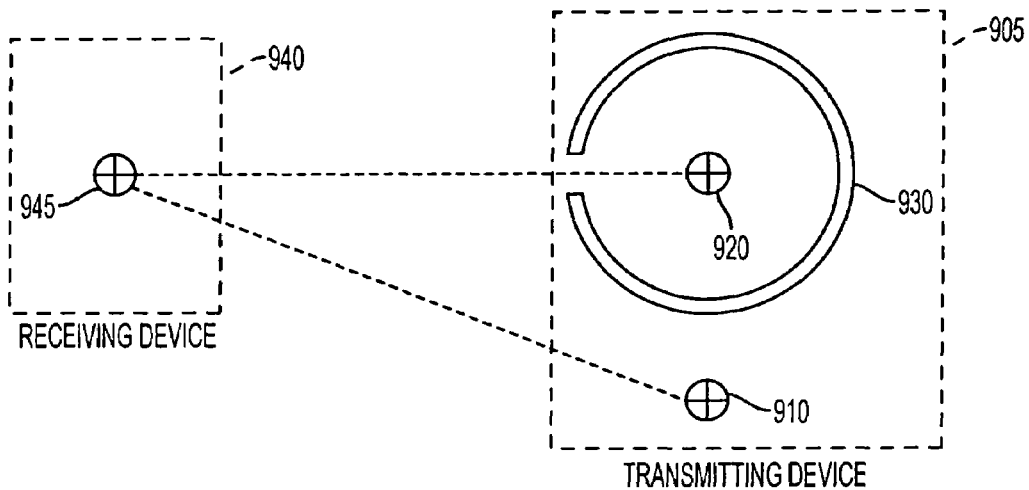

FIG. 9B illustrates the operation of device 900 more schematically. A receiving device 940 includes a remote detector 945 appropriate for the energy emitted by 920 and 910. Transmitter 905 includes source 910, which is shown in the same plane as the 930 mask arrangement, but only for clear illustration. In certain useful embodiments, the planar configuration would prevent operation in directions that are blocked by the rotating mask 930. Hence, the physical configuration of 9A is more practical.

In operation, emitter 910 emits an energy pulse each time the rotating mask passes a fixed radial point. Detector 945 receives a pulse from source 910 at regular intervals corresponding to the rotation rate of the detector. Detector 945 also receives a second pulse from source 920 every time the mask is oriented with the opening in the mask being in the line of sight with detector 945. In certain embodiments, the source 910 is strobed at a known rate, such as once per interval of time for the mask to complete a single rotation about its axis. For example, the source 910 may be strobed every time the mask is at a certain point in its rotation, such as zero degrees. The arrival time of the second pulse from source 920 will then indicate the mask rotational position relative to the predetermined zero-point thereof, which would be known to both receiving device 940 and transmitting device 905.

Figure 9C:
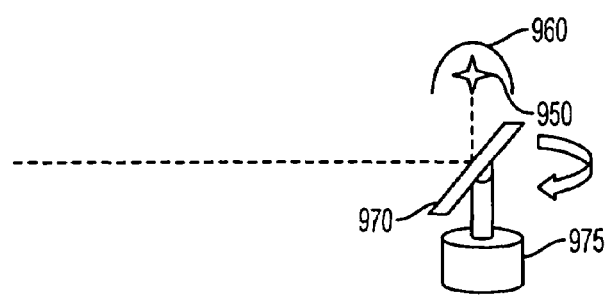

Other physical configurations of the rotational angle finding device described above will be obvious to those skilled in the art. FIG. 9C illustrates the use of a rotating reflector 970 rather than a rotating mask. The emissive energy source is illustrated at 950, a reflector or mirror appropriate to the energy type is illustrated at 970, and a means for rotation is illustrated at 975. Fixed mask 960 prevents energy from being emitted except onto the reflector 970. In certain embodiments, 960 may also include an internal focusing reflector to increase the efficiency of energy utilization from the emitter 950.

Each of these configurations may be implemented with the sources replaced by detectors in the same locations. This alternative embodiment would allow the system to determine angle of incidence. A third embodiment combines sources and detectors to measure both angle of emission and incidence. Additionally, either omni-directional or directional sources or both may be modulated by means known in the art to (a) identify the angle determining unit by a signature or (b) to transfer data between devices. Moreover, rotating masks may also be utilized to scan the angles on more than one axis to achieve multidimensional angle detection.

Figure 10:
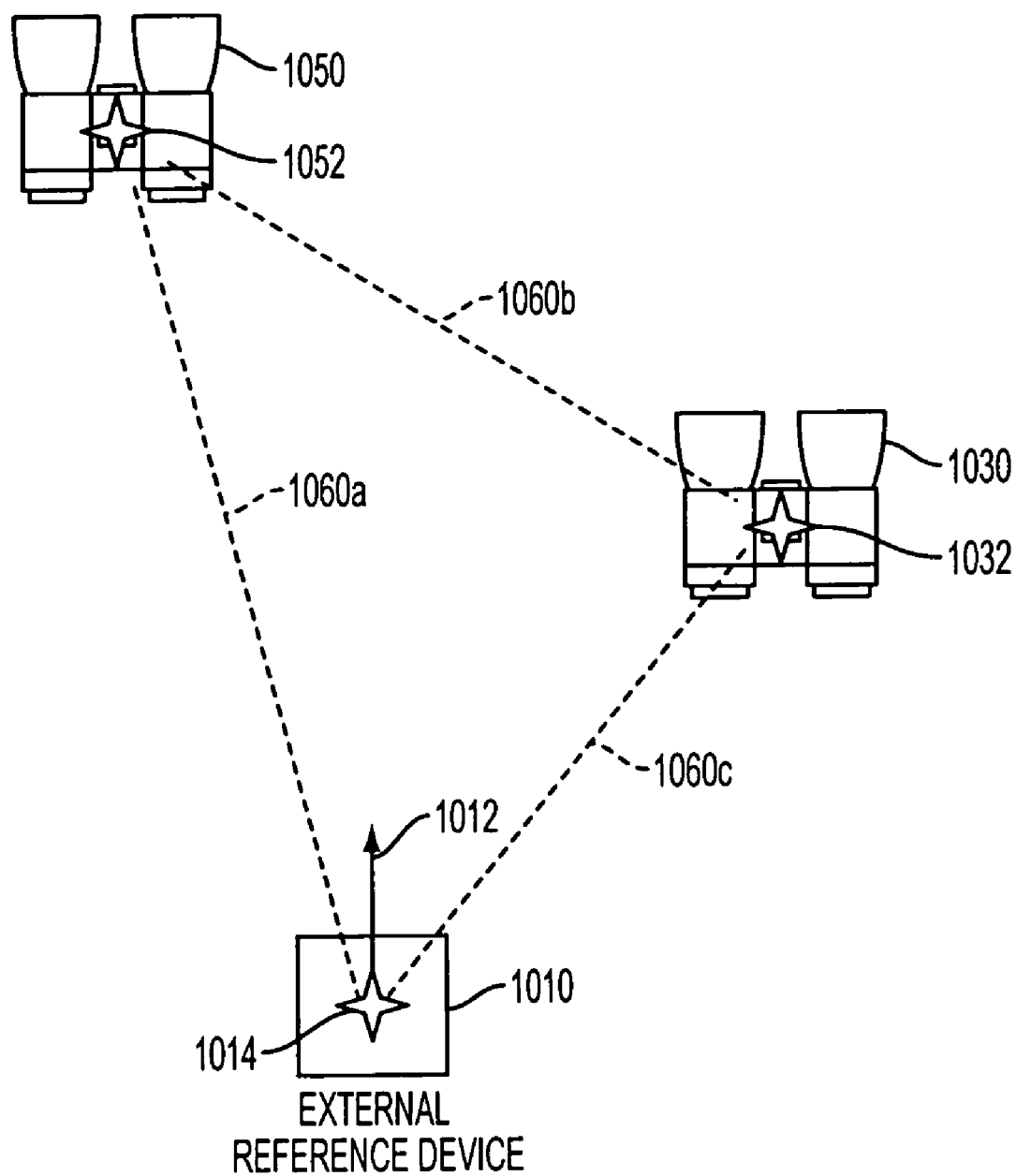
FIG. 10 is a schematic diagram showing an external reference alignment system in accordance with the present invention.

FIG. 10 illustrates a variation on previous alignment methods that utilizes an external fixed reference device. An external reference device 1010 is located physically removed from both user sighting devices 1030 and 1050. In certain embodiments, external reference device 1010 will have been previously aligned in a known fashion with a reference vector 1012, which may, for example, point north and perpendicular to the surface of the earth. However, any known bearing will suffice for the reference vector 1012.

The external reference device 1010 conveys the reference signal to sighting devices 1030 and 1050 via transmitters and/or receivers 1032 and 1052, respectively, utilizing energy beams 1060*c* and 1060*a*, respectively. These beams may be transmitted and received by known means, examples of such are given in the exemplary embodiments described herein. The reference signal 1060*b* between devices may also be transmitted according to exemplary embodiments above. As is shown in the figure, a complete triangle is defined and may be used to aid in calculating relative orientation of sighting devices 1030, 1050. External reference device 1010 may function as a secondary angle reference per the method described in reference to FIG. 8A–8B. When so embodied, external reference device 1010 provides not only a second beam to each of 1030 and 1050, but may also provide a reference to a known alignment. Similarly, external reference device 1010 may be used with any of the previous alignment methods to provide a third, fixed reference point in the system. The external device may also be used to provide stronger and better-calibrated energy sources that may be difficult or impossible to include in handheld units due to size, weight, or power restrictions, or may be undesirable in the mobile units due to stealth requirements. Moreover, an array of two or more external devices may be incorporated in the network to provide more extensive triangulation reference points for the mobile sighting devices. A third device may also be used to provide a fixed time-code reference to aid in calculation of absolute times at two or more independent devices.

Figure 11A:
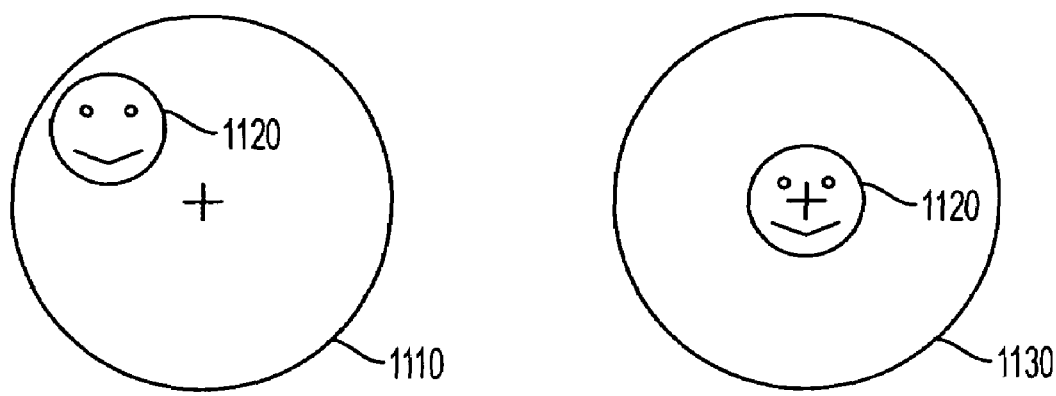
FIGS. 11A–11B are schematic diagrams illustrating an image feature recognition alignment system in accordance with the present invention.
Figure 11B:
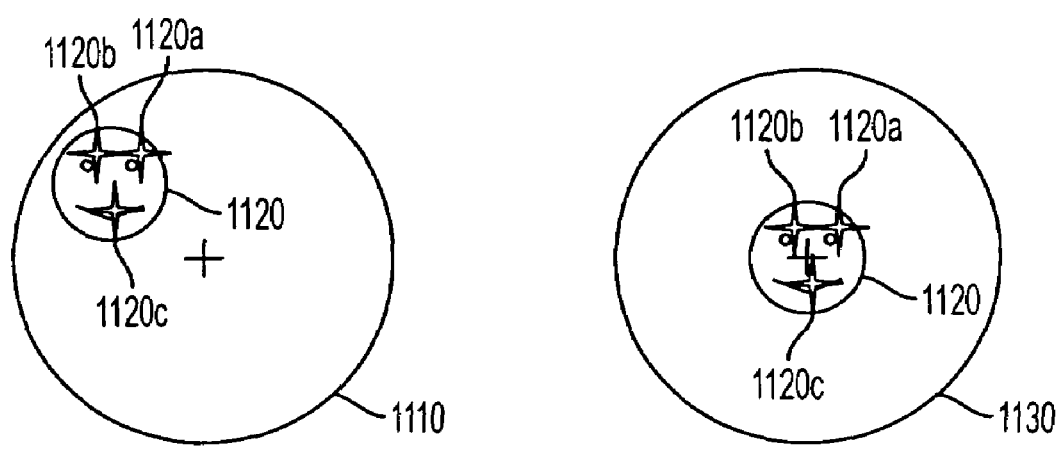

Referring to FIGS. 11A–11B, there is illustrated another method for aligning a sighting device. As shown in FIG. 11A, view field 1130 of the master sighting device is focused on target 1120, while the slaved view field 1110 is misaligned. By utilizing any of a number of well-known image processing techniques, target images are filtered and transformed in such a way that similar reference points 1120a–1120c, as shown in FIG. 11B, are consistently established. Exemplary image processing techniques include time-frequency transforms, such as wavelet analysis, and various computational edge and feature abstraction methods. A "feature" is commonly understood in the art to be an identifiable subcomponent of an image. For purposes of implementation in the present invention, features must be selected to be robust to image noise, lighting variations, and parallax related distortions of a particular scene. By facilitating rapid communications between the two units, feature extraction in one unit can be rapidly coupled to feature detection in the second unit. The processing may produce reference points by any means so long as the results are consistent for two reasonably offset views of the same target. Note that the features and reference points may not actually lie on the target per se, but may be extracted from the visual field around the target. In certain embodiments, such a system may also utilize points in a completely different region of space, such as by reference to a prominent fixed point such as the sun, or other bright light or reflection in the environment.

Once target reference points 1120a–1120c have been established in both sighting devices by image processing techniques known in the art, certain embodiments compute vectors indicating a direction in which the reference points 1120a–1120c must be translated in the slave view 1110 from positions in the master view 1130, which may be used to provide feedback to adjust the aim of slave sighting device.

The exemplary method just described requires only data communications between units, and the devices need not radiate direction finding or other specialized energy transmissions. However, it will be recognized by those skilled in the art that such image registration procedures are limited by parallax angle, lighting changes, camera variation and other factors. Hence, communication of distance between devices, offsets and relative orientations by means described herein can provide additional information to augment the image processing. The complexity of the signal processing involved with the method illustrated in FIG. 11A–11B is much greater than that of previous methods and requires a more expensive, complex and power hungry device. Nonetheless, increased precision in identifying very specific target points may justify the tradeoffs.

Figure 12:
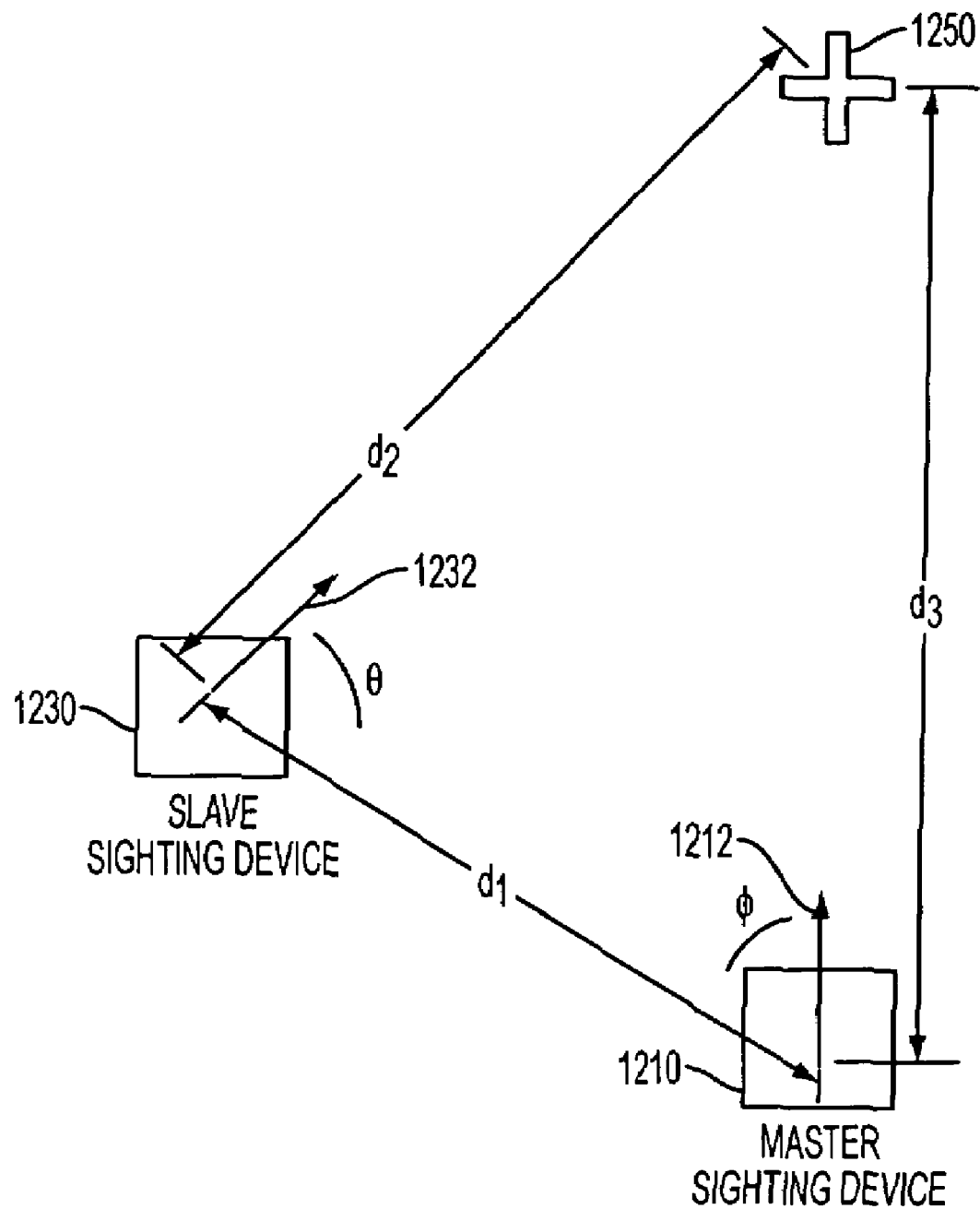
FIG. 12 is a schematic diagram illustrating a parallax compensation system in accordance with the present invention.

FIG. 12 illustrates schematically the fundamental elements of an exemplary parallax compensation system that may be used in conjunction with certain embodiments of the present invention. Sighting devices 1210 and 1230 are shown focused on the common target object 1250, with vectors 1212 and 1232 respectively indicating the orientation of each device. In accordance with certain embodiments of the invention, each of the distances $d_1$, $d_2$ and $d_3$ will be known, thus fully defining a triangle from which angles $\theta$ and $\phi$ may be derived by trigonometric methods. The sum of the angles $\theta$ and $\phi$ will be less than $\pi$ radians, which may be used to compensate aiming of the slave unit.

In certain useful embodiments, master sighting device 1210 includes any of a host of well known range finding mechanisms to determine the distance $d_3$ to the target object 1250. Similarly, the distance d, between sighting devices 1210 and 1230 is determined, such as by techniques previously described. It should be apparent that the distance $d_2$ will not be directly measurable until such time as the aim of slave sighting device 1230 is corrected. However, knowledge of angle (p, as determined by, for example, methods described above, completely defines the triangle and angle $\theta$ may be easily calculated using well-known trigonometric formulas. Once angle $\theta$ is known, processing and control circuits, such as those previously described, compensate the orientation of the slave sighting device 1230 and the user thereof will be directed via the feedback display towards the target object 1250 with greater accuracy.

As previously stated, in many applications, sighting devices will operate at a large distance from their target and distances $d_2$ and $d_3$ will be much larger than separation distance $d_1$. If the ratio $d_3/d_1$ (or $d_2/d_1$) is sufficiently large, very little need for parallax compensation will exist and the system can operate within certain design limits while safely omitting it. Some embodiments of the invention may also partially compensate for parallax by fixing an estimate of typical operating range $d_3$ and utilizing only the distance between sighting devices $d_1$ to adjust angles $\theta$ and $\phi$. Some slightly more advanced embodiments will estimate distance $d_3$ by encoding focal distance as set by the user, by, for example, sensing the position of a focusing thumbwheel or knob, or by entering a best guess with some other input means. Higher magnification and/or narrower fields of view will require better and more accurate parallax compensation known in the art.

Figure 13:
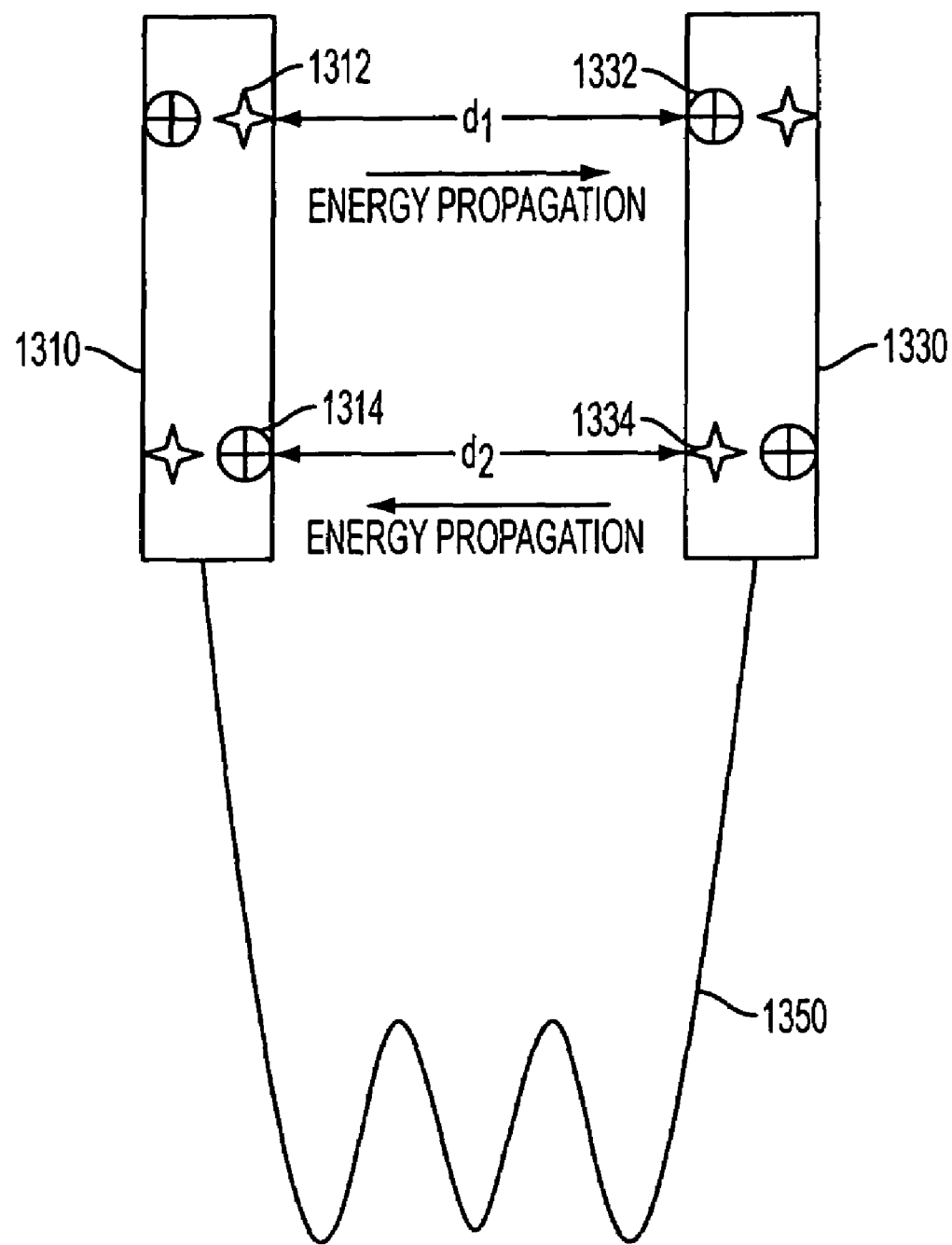
FIG. 13 is a schematic diagram illustrating emitter/sensor pairs for determining the hemisphere in which a slave sighting device is located relative to a master sighting device.

Referring to FIG. 13, there is shown two sighting devices 1310 and 1330, electrically coupled through data line 1350. Data line 1350 may be used, in certain embodiments of the invention, to implement a transmission channel to convey timing information so that the devices 1310, 1330 can determine absolute distances between reference signal emitter/receiver pairs. Data line 1450 may be replaced with a radio frequency or optical link to compliment slower reference signal links used to calculate distance. For example, an ultrasonic pulse may be transmitted in one transmission channel to be used for providing the characteristic of the reference signal, i.e., time-of-flight of a pulse, with a radio or optical transmission channel used for convey reference timing information. Since the speed of light is much greater than the speed of sound, the difference in arrival times can be used to reliably measure the sonic time-of-fight with sufficient accuracy to measure the distances for the purposes of certain embodiments of the present invention. In the exemplary configuration shown in the Figure, the reference signal link, whether the transmission channel is by cable, or by an electromagnetic signal in air, ultrasonic pulses may also be simultaneously transmitted by both devices without interfering one with the other and respective arrival times thereof can be accurately timed by the opposing sighting device.

The sighting devices 1310, 1330 are configured to be used in an approximately side-by-side arrangement. Each device has an emitter on one side of the primary sighting axis and a physically separated receiver on the opposite side of the primary sighting axis. They are arranged such that the distances $d_1$ and $d_2$ can be determined via energy propagation along the illustrated paths. The emitter/receiver pairs are so organized to resolve the relative (left/right) positions of the devices by determining which receiver detects the incoming reference signal.

Using the illustrated example of a cable transmission channel for transmitting a data carrying component of the reference signal and an air transmission channel for conveying the pulse modulated ultrasonic waveform for conveying a measurable reference characteristic, i.e., time-of-flight distance measurement, operation of the exemplary embodiment is now described. When the system is activated, pulses are emitted by sources 1312 and 1334 at regular intervals. The pulses may be emitted sequentially, simultaneously, or in any reasonable pattern since they will not interfere in flight. Coincident with each pulse emission, a timer is started. When the pulse wave front reaches the opposing sensor, the timer state information is communicated via the data carrying transmission channel and the timer is stopped. By timing the traversal time from transmitter 1312 to receiver 1332 (distance $d_1$) as well as the transversal time from transmitter 1334 to receiver 1314 (distance $d_2$), the distances $d_1$ and $d_2$ are determined and convergence or divergence in the illustrated spatial plane of the sighting axes of the devices can be determined. Timing and control circuits can be installed in either or both of devices 1310 and 1330, or may be located in a separate control chassis of the system (not shown). Further details of exemplary filtering and display update are described below with reference to FIG. 14. As mentioned above, the implementation of the transmission channel in a wire cable can be replaced by a wireless electromagnetic transmission with no substantial change in operation other than the timing data communications modality.

Only one dimension of alignment is illustrated in FIG. 13. Additional planes of orientation may be added by utilizing other detection means on orthogonal axes, such as by inclinometers, or by placing additional sensors displaced in other axes, as will be discussed below.

Many of the embodiments as yet described have been limited in their implementations, for purposes of illustration, to two-dimensional adjustment, i.e., the sighting devices operating in a single plane. For example, the exemplary embodiment illustrated in FIG. 5 is shown with two transmitters and two receivers to illustrate a simple alignment system in one plane according to the present invention. In order to adjust aim along two axes, the system must contain at least three points on at least one of the optical sighting devices. Note that each physically separated point must be at a known location relative to the others on the same device. Details are now provided as to embodiments that are fully operational in three-dimensional space.

Figure 14:
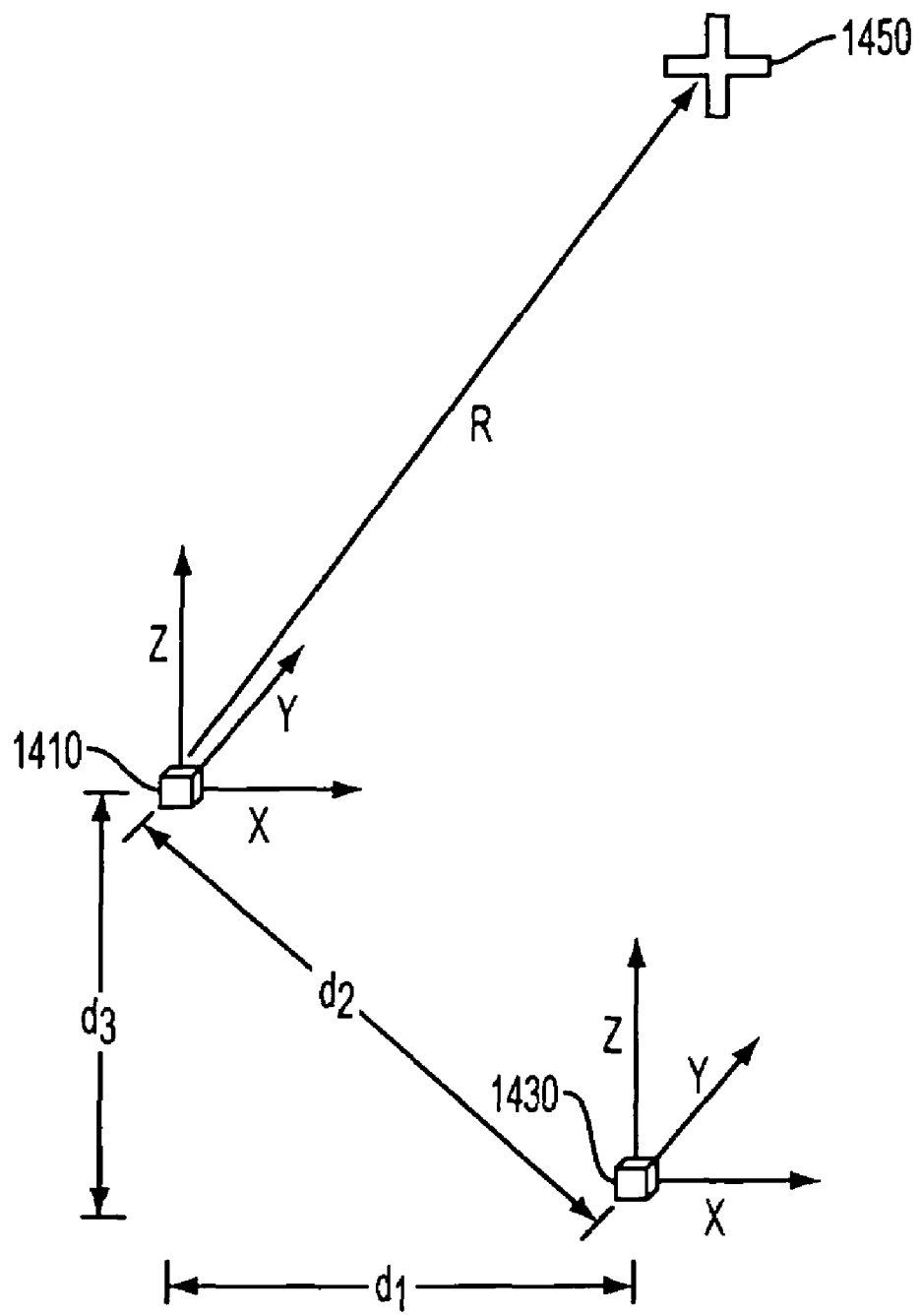
FIG. 14 is a block diagram illustrating the three dimensional geometry of alignment methods of the present invention.

In FIG. 14, two optical sighting devices 1410 and 1430, are abstracted to reveal their primary alignment characteristics. Each sighting device is situated with respect to its own set of X, Y, and Z-axes, with the Y-axis of each coordinate system aligned with its respective primary sighting axis. To resolve orientation differences, the required relative rotation about X, rotation about Y, and rotation about Z for each device is determined, as are the separation distance $d_1$ and elevation offset $d_3$ between the devices (or alternatively, the shortest path $d_2$), and the target range R. Rotations about Z correspond to convergence/divergence of the Y-axis, i.e. sighting axes, on the target 1450. Rotations about X correspond to declination (or pitch angle) and rotations about Y correspond to roll angle. Target range is used in conjunction with offset and separation to correct for parallax. Not shown is offset in the Y-axis, which also factors into parallax in case users are not at similar distances to the target.

Figure 15A:
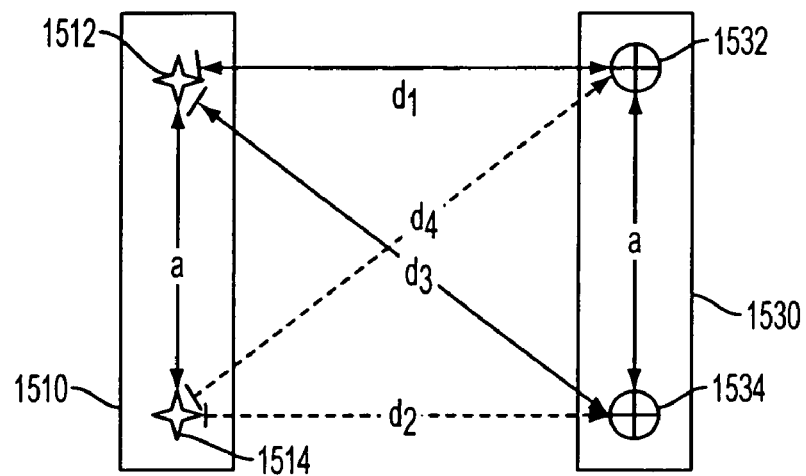
FIGS. 15A–15B are schematic diagrams illustrating an exemplary alignment method in three dimensions using time-of-flight as a reference signal characteristic in accordance with the present invention.

Referring now to FIG. 15A, there is schematically shown two sighting devices 1510 and 1530. Device 1510 has disposed thereon emitters 1512 and 1514 that transmits a reference signal in one reference plane to an opposing pair of receivers 1532 and 1534. Receivers 1532, 1534 are physically separated by a distance a along the primary optical axis of the sighting device 1530, as are, for purposes of simplicity, the emitters 1512, 1534. Obviously, the emitters may be separated by a different distance. The distances $d_1$ and $d_3$ are the minimum distances along a path from emitter 1512 to receivers 1532 and 1534, respectively, and distances $d_4$ and $d_2$ are the minimum distances from emitter 1514 to receivers 1532 and 1534, respectively.

Figure 15B:
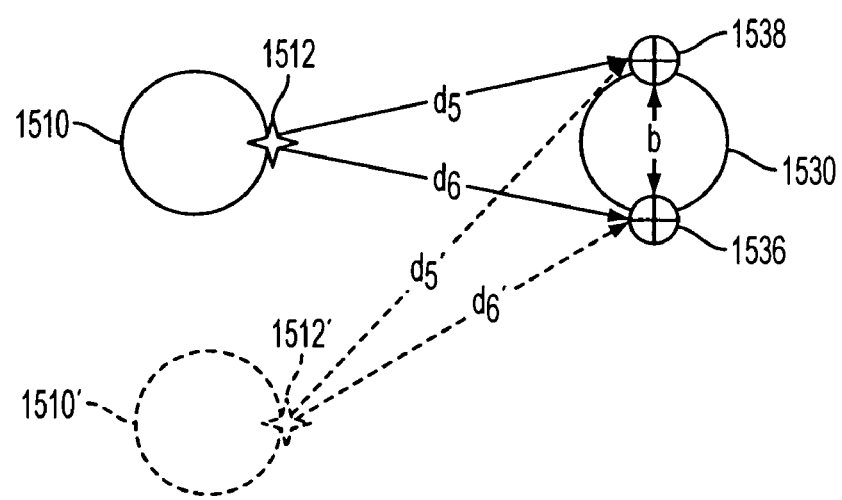

FIG. 105B illustrates the devices of FIG. 15A as viewed from the ends thereof, i.e., parallel to the primary sighting axes. The emitter 1512 is shown on the side of sighting device 1510 as an alternative arrangement to the top mounted position shown in FIG. 105A. It should be clear that a similar arrangement would be viewed from the other end of the sighting devices, with emitter 1514 shown where emitter 1512 is shown in FIG. 15B. The following description will be made with respect to emitter 1512, while forgoing a parallel description of the view from the opposing end of the sighting devices.

As shown in FIG. 15B, two receivers 1536 and 1538 are physically separated by a distance b along an axis perpendicular to the primary sighting axis of the device. The distances $d_5$ and $d_6$ are the minimum paths from emitter 1512 to receivers 1538 and 1536, respectively. The dashed image 1510' of sighting device 1510 refers to displacement of the primary optical axis of sighting device 1510 below that of sighting device 1530, which will be referred to hereinafter as "elevation offset."

FIGS. 15A and 15B illustrate a configuration in two planar views. As such, certain sensors enumerated in one view may be collocated with a sensor enumerated in the other view, e.g., element 1534 and 1538 may be embodied in a single receiving element. It should be apparent to those with skill in the art that alignment in three dimensions may be achieved via the configuration of sensors shown in the Figures. The distances a and b are peculiar to a particular sighting device and are known. The distances $d_1$–$d_6$ are variable and may be acquired by means previously discussed. Alignment is achieved when a known relationship between distances $d_1$–$d_6$ is obtained through relative orientations of the devices 1510, 1530.

The separation of sensors shown may be achieved with only three (rather than four) receivers are arranged in a triangle in the vertical plane. Conversely, additional receivers and emitters may be added to enhance information and field coverage around the device. One natural configuration would be to arrange emitters and receivers to cover left and right visual hemispheres around each device. Such implementation would allow the determination relative placement of the devices with respect to "handedness", i.e., which device is to the left or right of the other. As will be shown, such knowledge is useful in updating the guidance display so as to properly correct the alignment. Additionally, the information from the detectors 1532–1538 may be combined with information acquired from other sources to provide further accuracy.

Among its beneficial features, the present invention can determine an offset in elevation between master and slave devices and correcting therewith the orientation of the slave device accordingly. An exemplary elevation offset correction is explained with reference to FIG. 15B, which shows the master device 1510, on the right, and the slave device 1530, on the left, in the direction of the sighting axes, i.e., the sighting axis of each device, which are assumed to be parallel for purposes of illustration, is perpendicular to the drawing page. It is now assumed that each device is equipped with means to detect rotation about its respective sighting axis, which is referred to herein as "roll". In certain embodiments of the invention, roll detection may be accomplished by installing a gravity sensitive accelerometer, or inclinometer, in the appropriate orientation with respect to the sighting device. The output of the inclinometer may be processed in the orientation process executing on the processing and control unit of each device and the distances between devices can be calculate so as to account for sighting device roll.

An exemplary elevation offset determination is apparent from FIG. 15B. When the slave sighting device 1510 is lowered in elevation to its location at 1510', the path lengths of $d_5$ and $d_6$ become longer. This path difference may be detected by any of the means previously described, such as by a phase differential or by time-of-flight timing. The elevation offset may be compensated for by, for example, transmitting the master device roll as indicated by the inclinometer over a transmission channel to the slave device. The slave device, in turn, determines its own roll, and the correct distances, $d'_5$ and $d'_6$. Once the elevation offset has been determined, the user of the slave device, through the visual display previously described, may be directed to rotate the sighting device in the appropriate direction, which in the case of FIG. 15B, would be by rotating the distal end of the slave device at 1510' upward.

Of course, there are other means for determining elevation offset. For example, if the sighting devices were equipped with an altimeter or provided with altitude information from some other source, such as through a Global Positioning Satellite (GPS) receiver, the aiming direction of the slave sighting device could be compensated in the Z-Axis of FIG. 14 when mutual viewing in a common plane is not possible. In certain applications, such as when the GPS data is already available for use in other systems, such configuration may be preferred over In certain embodiments of the invention, operational modes may be combined so that absolute distances $d_1$–$d_4$ are determined as illustrated in FIG. 13, while relative distances $d_5$ and $d_6$ are determined by phase or time-of-flight differences. Thus, one complete multi-plane embodiment will include emitter/receiver pairs as illustrated in FIG. 13 on both upper and lower portions of the device. This configuration will permit operation of the system without an absolute reference such as a gravity-reference inclinometer, since the relative offset of front and rear of the primary optical axis can be determined. However, since the distance $d_5$ and $d_6$ also change with roll about the respective sighting axis of each device, an inclinometer adapted to track a fixed reference orientation, such as level with the horizon, may stabilize measurements of elevation offset.

Figure 16:
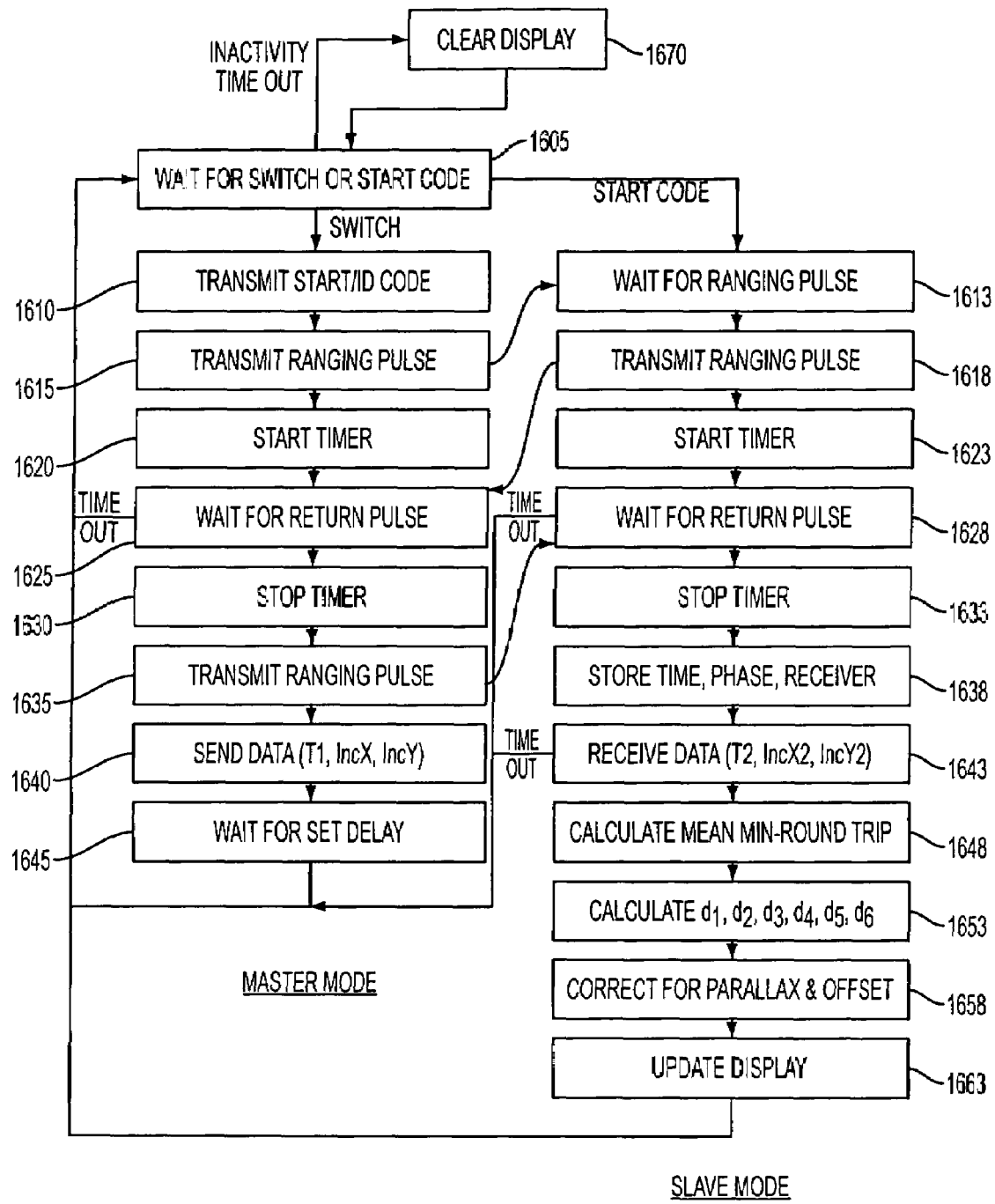
FIG. 16 is a flow diagram illustrating fundamental steps of an alignment method according to the present invention.

In FIG. 16, there are shown fundamental method steps of certain embodiments of the present invention via a flow diagram. The exemplary method illustrated details operation of a multi-sensor embodiment of the present invention. The exemplary embodiment may utilize ultrasonic or other energy sources such as infrared emitters or radio frequency transmitters known in the art. It may utilize collimated energy such as generated by a laser, but such is not necessary since the exemplary embodiment relies on relative timing and phase information rather than angle of emission or incidence.

The exemplary embodiment demonstrated in FIG. 16 includes two sighting devices, assumed in this example to be identical. Physical configuration of each device will include at least one emitter at a known location thereon, and at least one receiver at a known location thereon. The exemplary method conforms to the physical arrangement described with respect to FIG. 15, in which at least two receivers are physically separated along the primary sighting axis and two receivers are separately positioned along the axis perpendicular to the primary sighting axis. There is a minimum of three receivers on each device. The receivers may be physically combined with emitters in some embodiments, for example ultrasonic transducers and radio frequency antennas may be operated in either transmit of receive modes, by principle of reciprocity. The exemplary embodiment includes two emitters physically separated along the optical axis of the device 1510. This facilitates determination of distances $d_1$ and $d_2$ directly and simplifies operations. Of course, other emitter configurations are clearly possible and are within the scope of the present invention as long as the relationship between $d_1$ and $d_2$ is calculable therefrom. Additional receivers and emitters will be located on the device frames to increase energy dispersion and reception fields as appropriate to the application. It is to be noted that the display update process described below requires knowledge as to which device is on the left and which is on the right relative to the direction of view. This can be determined by, for example, using the hemi-field configuration discussed with reference to FIG. 13.

The exemplary operation demonstrated in FIG. 16 assumes the units are symmetrical with emitters collocated with the receivers. For example, in FIG. 15A, sighting device 1510 is shown as transmitting with emitters 1512 and 1514 and unit 1530 is shown as receiving with receivers 1532 and 1530. It should be clear that the operation of the transducers would be reversed when sighting device 1530 is transmitting. Collocation is achieved by using bi-directional devices, or transceivers, such as ultrasonic transducers and radio frequency antennas. Alternatively, transmitters and receivers may be placed substantially at the same point on the frame, such as an LED adjacent to a photodiode.

Knowledge of distances $d_1$ and $d_2$ is sufficient to determine divergence or convergence of the sighting axes within the plane of the Figure. The present invention does not strictly require that distances $d_3$ and $d_4$ be determined. It should be apparent to those skilled in the art, however, that these additional distances provide both a means for determining front-to-back offset of the observers and a means of improving the estimates of divergence for parallax correction.

In the exemplary embodiment, no physical connection is assumed between devices. communication may be carried out by modulating the emissive energy source providing the reference signal. However, the use of a cable is not excluded. It is within the scope of the invention to utilize a cable for data transmission and to transmit the characteristic portions of the reference signal in a separate channel for alignment purposes.

In the exemplary physical configuration, inclinometers, such as gravity sensitive accelerometers, are utilized to determine rotations in pitch and roll relative to gravity according to the geometry described with reference to FIG. 14. A two-axis accelerometer oriented in the X-Y plane of each sighting device 1510 and 1530 are operable to indicate a value proportional to rotation about Y (roll) and about X (pitch, or declination.) It should be noted that these inclinometers do not require a fixed tripod reference.

Referring now to FIG. 16, operation of each sighting device begins in a wait loop, illustrated at 1605. Previous activity of the device may have placed display data on the feedback display. After a predetermined timeout period, if no activity is detected, flow is transferred to 1670 to clear any existing information on the display. Depressing a switch on a sighting device activates that device in the Master Mode and is thereafter referred to as the "Master Device". A conflict may arise when both devices attempt to become the Master, and is resolved by "time out" exits later in the process under the assumption that one of the users will eventually release the switch and yield.

The Master Device transmits a start/ID code as shown at 1610. The receiving sighting device receives the start code and is placed into Slave Mode, where it becomes the "Slave Device". Method steps executed by the Master Device are shown on the left side of the flow diagram and those executed by the Slave Device are shown on the right side of the diagram.

The Slave Device changes state, as illustrated at 1613, to wait for a ranging pulse from the Master. The Master Device sends the ranging pulse at block 1615 and starts a timer at block 1620. Upon receipt of the ranging pulse, the Slave Device sends a return ranging pulse at 1618 and starts its own timer at 1623. Both devices wait for respective return pulses, at block 1625 for the Master and at block 1628 for the Slave, which may overlap in time since time-of-flight between the devices is finite and assumed to be on a longer time scale than is measured by the timer. If either the Master or the Slave device fails to detect a return pulse in predetermined period of time, that device times out and returns to wait mode at block 1605.

When a return pulse is detected by the Master Device, the timer is stopped, as shown at block 1630 and a second ranging pulse is sent to the Slave Device. The second pulse is followed by at least two pieces of data, as shown at block 1640: the round trip elapsed time T1 and the inclination in the primary axis of the Master device IncX, as measured by the inclinometer.

The Slave Device receives the return pulse at block 1628, stops its timer at block 1633 and stores the round trip time of its ranging pulse together as well as phase information of the return for each receiver element. The relative time-of-flight and phase information will be utilized to calculate relative orientation based on the physical geometry of the emitters and receivers. The Slave Device also receives the data transmitted from the Master, as shown at block 1643. The Slave Device calculates mean round-trip time at block 1648 by averaging the respective timer values of each sighting device. Each timer value can be converted directly to an estimate of inter-device distance by multiplying with the speed of the energy transmission and dividing by two.

In certain embodiments of the invention, the incoming range data will generally be filtered to screen out false returns. Typically, the first pulse (minimum time) of a series is used since additional pulses may be environmental reflections. Moreover, reasonable distances may be used to window the range of times and screen out near-field back scattering of one device's emitter into its own detector. Pulse time windows may also be set dynamically based on prior knowledge of previously sampled positions. Minimum and windowed data will also be averaged in order to smooth random variations due to sampling error, vibration, and quantization. Inclinometer information will be similarly smoothed so that a relatively stable mean inclination is utilized in calculations. Additionally, human reaction time may be considered and the directional indicators should provide stable, averaged information to the user. For example, sampling on the order of 10 times per second and averaging over ten such samples (1 second) for each update of the indicator display provides a stable feedback display for a typical handheld consumer optical device. However, these figures will vary widely with application and magnification settings.

Referring once again to FIGS. 15A–15B, assume for purposes of illustration that sighting device 1510 is the Master Device. The transducers may operate in the following sequence. A first ranging pulse (block 1615) is emitted by transducer 1512. Transducer 1532 receives the pulse (block 1613) and after a known delay, sighting device 1530 transmits a ranging pulse (block 1618) back to the master using transducer 1532 as an emitter. When this ranging pulse is received at transducer 1512, (block 1625) the Master's timer has measured twice the time-of-flight for the distance d, plus a constant value taking into account the processing delay between receiving and recognizing a pulse and sending one out as a response thereto. The second ranging pulse is transmitted (block 1635) using transducer 1514 as an emitter. This pulse is received (block 1628) by transducer 1534 on sighting device 1530 causing the Slave's timer to stop (block 1633). The Slave's timer now has measured the time-of-flight for $d_1+d_2$, again plus a known constant. The Master sends (block 1640) and the Slave receives (block 1643) time and inclination data. The mean distance along the leg $d_1$ is calculated by subtracting any known constant delays from the Master timer data and dividing by two. The distance along leg $d_2$ is calculated by subtracting the $d_1$ time value from the slave timer measurement along with any known constant delays. The distances may be converted to a physical length using the speed of the energy medium in some embodiments or the time value may be utilized directly for simple comparison operations.

The relative angle of orientation in the plane of FIG. 15A is determined by the values of $d_1$ and $d_2$ and the inter-sensor distances a. The distances $d_3$ and $d_4$ are calculated in some embodiments and may be utilized to cross check this primary orientation information, as well as to measure offset between the users front-to-back along the optical axis. The difference in lengths $d_5$ and $d_6$ combined with the fixed base of the triangle defined by inter-sensor distance b determine the vertical (z-axis) offset of the devices as depicted in FIG. 15B. Roll inclination IncY can be used to fix relative interior angles, and pitch incline IncX to correct for twist in the triangle frame. The distance calculations are performed at block 1653.

In the exemplary embodiment, relative inclination can be determined simply by exchanging inclination information as measured by gravitationally sensitive accelerometers. The reference signal transmitted as the energy pulse adds the additional information necessary to determine divergence and convergence and optical axis horizontal separation and vertical offset. This is a specific improvement over prior art that offered no means for achieving these measures in an arbitrary setting.

The Slave Device further corrects its calculations for parallax in two dimensions, as shown at block 1658. The sighting axis offset is used to adjust the relative inclination information. The inter-device distance is utilized to adjust the relative convergence/divergence information. The front-to-back offset along the optical axis may be determined from $d_3$ and $d_4$ (if available) may be used to further correct for parallax. As previously discussed, the range of the target enters into these calculations and may be determined in a host of well-known ways including by determining focal distance, or by direct ranging or in simpler embodiments, may be approximated with a preset typical value.

The Slave Device updates its display, as shown at block 1663, according to a process similar to the exemplary process discussed in paragraphs that follow. Slave Device flow is transferred to block 1605, where the device enters a wait state. Meanwhile, the Master Device enters a predetermined delay shown at block 1645. The delay period is made long enough to allow all calculations and display updates in the Slave Device. The Master then enters the wait state at block 1605. If the switch remains depressed, then the process repeats with the same Master and Slave devices until the switch is eventually released.

Variations of the exemplary method are within the scope of the invention. By introducing a fixed timing reference, such as might be provided by a time-locked external signal, such as GPS, or by an electrical coordination signal, such as via a physical cable), it is possible to determine one-way transit times rather than round-trip times. Hence, embodiments of the invention with a common time source may calculate distance from the transmitter of one device to the receiver of the other directly and compare absolute values rather than compare indirectly calculated information.

Figure 17:
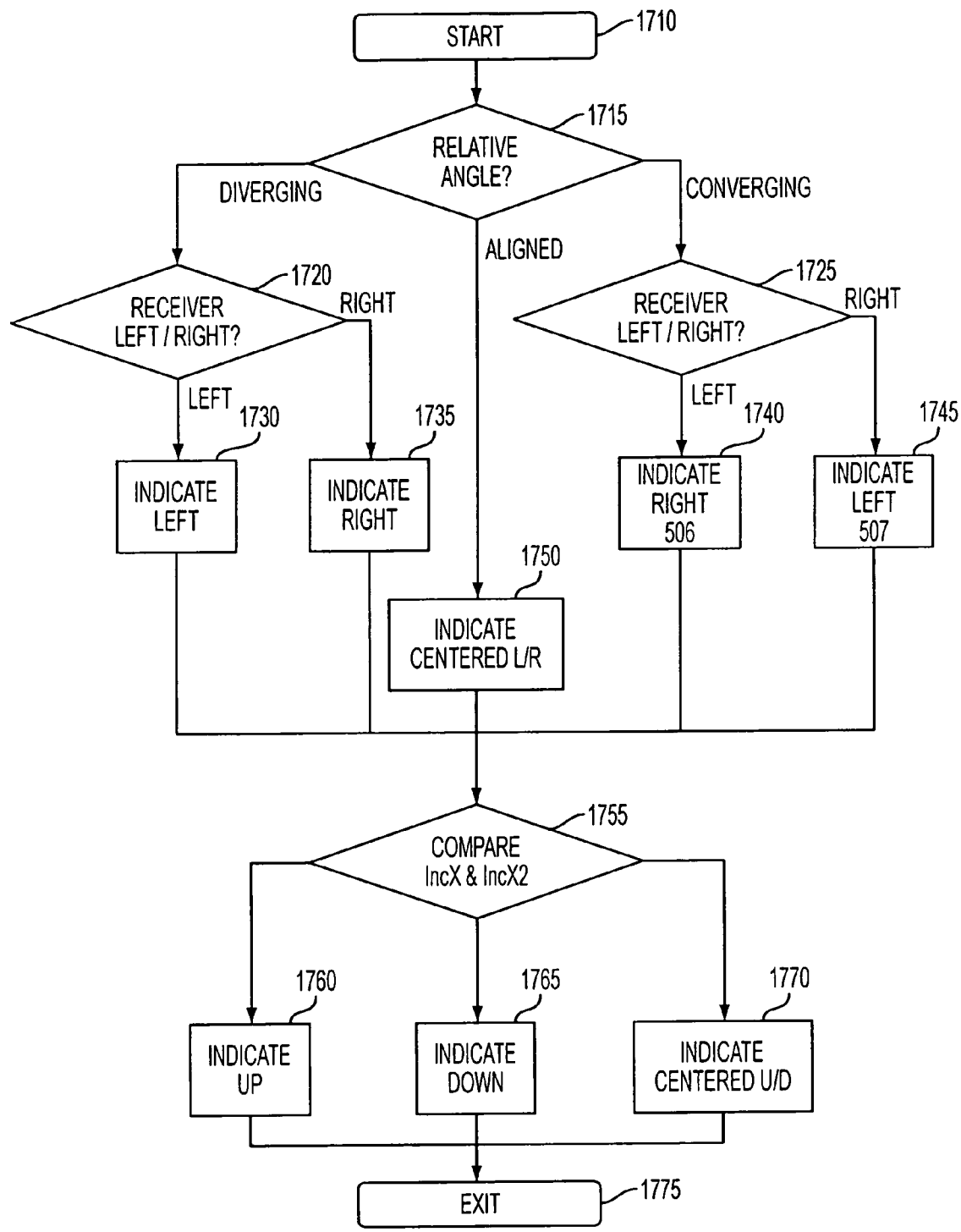
FIG. 17 is a flow diagram illustrating fundamental steps of a feedback display update method according to the present invention.

FIG. 17 illustrates an exemplary method for handling the information for display update. Upon entry at block 1710, it is assumed that relative angle in yaw and pitch of the primary sighting axis have been determined and correction for any offset or parallax has been applied as appropriate. In block 1715, the relative angle is compared to determine the convergence or divergence of the optical axis in the horizontal plane (yaw). If divergence is detected, then the relative locations of the two devices are determined at block 1720. If the Slave Device determines that the reference signal is arriving on its left, then a rotation to the right is indicated in the display, as shown at block 1730. If the positions of the Master and Slave devices are reversed, then an indication to rotate left is provided in the display, as shown at 1735. In similar fashion, if the units are converging then the relative locations of the devices, as determined at block 1725, is used to indicate the rotation in alignment in an opposite manner, as shown at blocks 1740 and 1745. If the sighting axes of both devices are aligned with the target, and the applicable data corrections have been applied, an indication of centered is displayed, as shown at block 1750.

A similar process is used to compare the units in the vertical plane (pitch). First, it is assumed that the inclination of the Slave Device and the inclination of the Master Device have been determined. The relative angles are simply compared and indications are displayed to rotate up, at block 1760, down, at block 1765, or centered, at block 1770. The process then ends at block 1775 and flow is transferred to the calling routine.

The descriptions above are intended to illustrate possible implementations of the present invention and are not intended to be restrictive. Many variations, modifications and alternatives will become apparent to the skilled artisan upon review of this disclosure. For example, components equivalent to those shown and described may be substituted therefor, elements and methods individually described may be combined, and elements described as discrete may be distributed across many components. The scope of the invention should therefore be determined with reference to the description above, but with reference to the appended claims, along with their full range of equivalents.

What is claimed is:

1. A method for directing respective sighting axes of independent sighting devices towards a common target object, the method comprising the steps of:
   providing a first sighting device operable by a first user to be oriented in space, said first sighting device having a first sighting axis and a transmitter for transmitting a reference signal;
   providing a second sighting device operable by a second user to be oriented in space independently of said orientation in space of said first sighting device, said second sighting device having a second sighting axis, said second sighting device including a receiver for receiving said reference signal, said second sighting device further including an indicator for indicating to said second user a correction direction to apply to said orientation in space of said second sighting device;
   aligning said first sighting axis on the target object;
   transmitting via said transmitter said reference signal upon aligning said first sighting axis with the target object;
   receiving via said receiver said reference signal;
   acquiring a characteristic of said reference signal, said characteristic other than information-bearing data containing said orientation in space of said first sighting device encoded on said reference signal;
   determining a relative orientation in space of said second sighting device respective said first sighting device from at least said characteristic;
   determining an orientation correction from said relative orientation of said second sighting device respective said first sighting device; and,
   indicating said orientation correction of said second sighting device via said indicator so as to direct said second sighting axis towards the target object.

2. The method for directing respective sighting axes of independent sighting devices towards a common target object as recited in claim 1 including the steps of:
   pulse-modulating a carrier waveform of said reference signal prior to transmitting in said reference signal transmitting step;
   acquiring a traversal time for a pulse of said pulse-modulated reference signal to traverse a transmission channel between said first sighting device and each of a plurality of predetermined locations on said second sighting device in said characteristic acquiring step;
   determining from said traversal time a distance from said transmitter to each of said plurality of locations in said relative orientation determining step;
   determining a difference between said distance determined for each of said plurality of locations and a corresponding predetermined distance for each of said plurality of locations in said orientation correction determining step;
   indicating on said indicator a direction of rotation of said second sighting device so as to decrease said difference at each of said plurality of locations in said orientation correction indicating step; and
   repeating the method at said reference signal transmitting step until said difference at each of said plurality of locations is below a predetermined threshold.

3. The method for directing respective sighting axes of independent sighting devices towards a common target object as recited in claim 2 including the steps of:
   providing said transmitter with a plurality of emitters;
   transmitting said reference signal from each of said emitters in said reference signal transmitting step;
   acquiring said traversal time for said pulse of said pulse-modulated reference signal to traverse a transmission channel between each of said emitters and each of a plurality of predetermined locations on said second sighting device in said traversal time acquiring step;
   determining from said traversal time a distance from each of said emitters to each of said plurality of locations in said distance determining step;
   determining a difference between each said distance determined for each of said plurality of locations from each said emitter and a corresponding predetermined distance for each of said plurality of locations in said distance difference determining step; and, indicating on said indicator a direction of rotation of said second sighting device so as to decrease each said difference at each of said plurality of locations in said direction of rotation indicating step.

4. The method for directing respective sighting axes of independent sighting devices towards a common target object as recited in claim 2 including the steps of:

providing said transmitter with an acoustic emitter and an electromagnetic emitter;

providing said receiver with an acoustic detector at each said plurality of locations on said second sighting device and an electromagnetic signal detector;

transmitting said pulse-modulated carrier waveform via said acoustic emitter and an pulse transmission time corresponding to each pulse of said pulse-modulated carrier waveform via said electromagnetic emitter in said reference signal transmitting step; and, acquiring said pulse transmission time via said electromagnetic signal detector and a time of arrival for said corresponding pulse in said traversal time determining step, said traversal time being computed as a difference between said arrival time and said transmission time.

5. The method for directing respective sighting axes of independent sighting devices towards a common target object as recited in claim 2 including the steps of:

providing said first sighting device with an acoustic detector and a timer;

providing said second sighting device with an acoustic emitter;

providing said transmitter with an acoustic emitter and an electromagnetic emitter;

providing said receiver with an acoustic detector at each said plurality of locations on said second sighting device and an electromagnetic signal detector;

transmitting a pulse of said pulse-modulated carrier waveform via said acoustic emitter of said transmitter and starting said timer in said reference signal transmitting step;

transmitting an acoustic pulse via said acoustic emitter on said second sighting device upon receiving said transmitted pulse from said transmitter at said plurality of locations;

receiving at said acoustic detector of said first sighting device said pulse transmitted from said second sighting device and stopping said timer;

calculating at said first sighting device a pulse traversal time as one-half a time elapsed between said start and said stop of said timer;

transmitting said pulse traversal time corresponding via said electromagnetic emitter; and, acquiring said pulse traversal time via said electromagnetic signal detector a in said traversal time determining step.

6. The method for directing respective sighting axes of independent sighting devices towards a common target object as recited in claim 1 including the steps of:

polarizing a carrier waveform of said reference signal prior to transmitting in said reference signal transmitting step;

acquiring at said second sighting device a polarization state of said carrier waveform in said characteristic acquiring step;

determining an orientation of said second sighting device with respect to said polarization state in said relative orientation determining step;

determining a difference between said received polarization state and a corresponding predetermined polarization state in said orientation correction determining step;

indicating on said indicator a direction of rotation of said second sighting device so as to decrease said difference in said orientation correction indicating step; and repeating the method at said reference signal transmitting step until said difference is below a predetermined threshold.

7. The method for directing respective sighting axes of independent sighting devices towards a common target object as recited in claim 1 including the steps of:

providing said receiver with a plurality of phase detectors at each of a plurality of predetermined locations on said second sighting device;

acquiring at said second sighting device a phase of said reference signal at each of said phase detectors in said characteristic acquiring step;

determining a phase distribution from said phase at each of said phase detectors in said relative orientation determining step;

determining a difference between said phase distribution and a corresponding predetermined phase distribution in said orientation correction determining step;

indicating on said indicator a direction of rotation of said second sighting device so as to decrease said difference in said orientation correction indicating step; and repeating the method at said reference signal transmitting step until said difference is below a predetermined threshold.

8. The method for directing respective sighting axes of independent sighting devices towards a common target object as recited in claim 1 including the steps of:

providing said transmitter with a transmit angle determining unit;

providing said receiver with an receive angle determining unit;

transmitting an indication of a transmission angle of said reference signal as determined by said transmit angle determining unit in said reference signal transmitting step;

acquiring at said second sighting device an angle of incidence of said reference signal via said receive angle determining unit in said characteristic acquiring step;

determining at said second sighting device said transmission angle of said reference signal from said transmitted indication thereof in said relative orientation determining step;

determining a difference between a sum of said angle of incidence and transmission angle and a predetermined value of said sum in said orientation correction determining step;

indicating on said indicator a direction of rotation of said second sighting device so as to decrease said difference in said orientation correction indicating step; and repeating the method at said reference signal transmitting step until said difference is below a predetermined threshold.

9. The method for directing respective sighting axes of independent sighting devices towards a common target object as recited in claim 8 including the step of:

transmitting a pair of pulses in said transmission angle indication transmitting step, whereby a temporal displacement between said pair of pulses as received at said second sighting device is indicative of said transmission angle.

10. The method for directing respective sighting axes of independent sighting devices toward a common target object as recited in claim 1 further including the steps of:

providing said first sighting device and said second sighting device a respective orientation sensor for sensing an orientation of said corresponding one of said first sighting device and said second sighting device;

transmitting to said second sighting device said orientation of said first sighting device as sensed by said orientation sensor thereof in said reference signal transmitting step;

compensating said relative orientation of said second sighting device as determined in said relative orientation determining step with compensation values determined from said transmitted orientation of said first sighting device and an orientation of said second sighting device as determined from said orientation sensor thereof in said orientation correction determining step.

11. A method for directing respective sighting axes of independent sighting devices towards a common target object, the method comprising the steps of:

providing a first sighting device operable by a first user to be oriented in space, said first sighting device having a first sighting axis and a receiver for receiving a reference signal;

providing a second sighting device operable by a second user to be oriented in space independently of said orientation in space of said first sighting device, said second sighting device having a second sighting axis, said second sighting device including a transmitter for transmitting said reference signal, said second sighting device further including an indicator for indicating to said second user a correction direction to apply to said orientation in space of said second sighting device;

aligning said first sighting axis on the target object;

transmitting via said transmitter said reference signal upon aligning said first sighting axis with the target object;

receiving via said receiver said reference signal;

acquiring a characteristic of said reference signal at said second sighting device, said characteristic other than information-bearing data containing said orientation in space of said first sighting device encoded on said reference signal;

determining a relative orientation in space of said second sighting device respective said first sighting device from at least said characteristic;

determining an orientation correction from said relative orientation of said second sighting device respective said first sighting device; and, indicating said orientation correction of said second sighting device via said indicator so as to direct said second sighting axis towards the target object.

12. A system for aligning independently oriented sighting devices toward a common target object, the system comprising:

a first sighting device having a first sighting axis, said first sighting device including a reference signal transmitter for transmitting a reference signal upon aligning said first sighting axis on the common target object;

a second sighting device having a second sighting axis, said second sighting device including a reference signal receiver for receiving said reference signal from said first sighting device, said second sighting device further including a relative orientation processing unit coupled to said receiver for determining from at least a characteristic of said reference signal a relative orientation in space of said second sighting device with respect to an orientation in space of said first sighting device, said characteristic other than information-bearing data containing said orientation in space of said first sighting device encoded on said reference signal, said second sighting device including an indicator coupled to said relative orientation processing unit for indicating a direction in which to direct said second sighting axis so as to be aligned on the common target object.

13. The system for aligning independently oriented sighting devices toward a common target object as recited in claim 12, wherein said reference signal includes a carrier and a modulated carrier envelope.

14. The system for aligning independently oriented sighting devices toward a common target object as recited in claim 13, wherein said characteristic of said reference signal is channel traversal time of said modulated carrier envelope.

15. The system for aligning independently oriented sighting devices toward a common target object as recited in claim 13, wherein said characteristic of said reference signal is a phase difference of said carrier at predetermined locations on said second sighting device.

16. The system for aligning independently oriented sighting devices toward a common target object as recited in claim 15, wherein said predetermined locations on said second sighting device include non-collinear locations along the sighting axis thereof.

17. The system for aligning independently oriented sighting devices toward a common target object as recited in claim 13, wherein said reference signal further includes a data carrying component.

18. The system for aligning independently oriented sighting devices toward a common target object as recited in claim 17, wherein said data of said data carrying component includes an indication of a time of transmission of said modulated carrier envelope of said reference signal.

19. The system for aligning independently oriented sighting devices toward a common target object as recited in claim 13, wherein component signals of said reference signal are conveyed over separate transmission channels.

20. The system for aligning independently oriented sighting device toward a common target object as recited in claim 19, wherein said carrier and said modulated carrier envelope are conveyed in a first transmission channel and a data carrying component of said reference signal is carried in a second transmission channel.

21. The system for aligning independently oriented sighting devices toward a common target object as recited in claim 20, wherein a pulse modulated acoustic wave is conveyed in said first transmission channel and an electromagnetic signal is conveyed in said second transmission channel.

22. The system for aligning independently oriented sighting devices toward a common target object as recited in claim 21, wherein said data carrying component includes an indication of a time of transmission of said modulated carrier envelope of said reference signal.

23. The system for aligning independently oriented sighting devices toward a common target object as recited in claim 22, wherein said second channel is established in a transmission medium separate from said first channel.

24. The system for aligning independently oriented sighting devices toward a common target object as recited in claim 12, wherein said characteristic of said reference signal is a state of polarization thereof, said receiver including a polarization detection unit, said relative orientation processing unit determining said relative orientation in space of said second sighting device from a signal produced by said polarization detection unit responsive to said state of polarization of said reference signal.

25. The system for aligning independently oriented sighting devices toward a common target object as recited in claim 24, wherein said polarization detection unit includes a plurality of polarization detectors, said signal produced by said polarization detection unit corresponding to relative signal strength from each said polarization detectors responsive to said state of polarization of said reference signal thereon.

26. The system for aligning independently oriented sighting devices toward a common target object as recited in claim 24, where said polarization detection unit includes a polarization detector mounted on a steerable platform, said steerable platform operable to adjust an orientation of said polarization detector so as to align said state of polarization of said reference signal therewith.

27. The system for aligning independently oriented sighting devices toward a common target object as recited in claim 12, wherein said characteristic of said reference signal is an angle of incidence thereof on said receiver, said receiver including an angle determining unit for determining said angle of incidence, said relative orientation processing unit determining said relative orientation of space of said second sighting device from a signal produced by said angle determining unit responsive to said angle of incidence on said receiver.

28. The system for aligning independently oriented sighting devices toward a common target object as recited in claim 27, wherein said reference signal includes a plurality of signal components, each of said signal components carried in a separate transmission channel.

29. The system for aligning independently oriented sighting devices toward a common target object as recited in claim 28, wherein said reference signal includes a first pulse modulated signal conveyed over a first transmission channel and a second pulse modulated signal conveyed over a second transmission channel, a transmission time of said first pulse modulated signal temporally separated from a transmission time of said second pulse modulated signal corresponding to an angular displacement of said first sighting device relative to said second sighting device, said angle determining unit determining said angle of incidence by a time of arrival of a pulse received over said first transmission channel relative to a time of arrival of a pulse received over said second transmission channel.

30. The system for aligning independently oriented sighting devices toward a common target object as recited in claim 28, wherein said reference signal includes a first component signal conveyed over a first transmission channel and a second component signal conveyed over a second transmission channel, a transmitted phase of said first component signal coinciding with a transmitted phase of said second component signal, said angle determining unit determining said angle of incidence by a difference in phase between said first component signal received over said first transmission channel and said second component signal received over said second transmission channel.

31. The system for aligning independently oriented sighting devices toward a common target object as recited in claim 28, wherein said reference signal includes a first component signal conveyed over a first transmission channel and a second component signal conveyed over a second transmission channel, said angle determining unit including a receiving aperture and a detector array, said detector array producing a signal responsive to a location of said reference signal incident thereon, said angle determining unit determining said angle of incidence by a location on said detector array of said first component signal as received through said receiving aperture and a location on said detector array of said second component signal as received through said receiving aperture.

32. The system for aligning independently oriented sighting devices toward a common target object as recited in claim 12, wherein said second sighting device further includes parallax compensating means operable on said characteristic of said reference signal to indicate via said indicator means said aiming direction when a distance to the common target object is such that said sighting axis of said second sighting device is not substantially parallel to said sighting axis of said first sighting device when both first and second sighting devices are aligned on the common target object.

33. A system for aligning independently oriented sighting devices toward a common target object, the system comprising:

a first sighting device having a first sighting axis, said first sighting device including a reference signal transmitter for transmitting a reference signal upon aligning said first sighting axis on the common target object;

a second sighting device having a second sighting axis, said second sighting device including a relative orientation processing unit determining an orientation in space of said second sighting device with respect to an orientation in space of said first sighting device, said second sighting device further including at least one orientation sensor for determining an orientation of said second sighting device in a corresponding single plane of space relative to a predetermined orientation in said corresponding single plane, said at least one orientation sensor coupled to said relative orientation processing unit and providing a signal thereto responsive to said relative orientation in said corresponding single plane, said second sighting device further including a reference signal receiver for receiving said reference signal from said first sighting device, said receiver coupled to said relative orientation processing unit and providing thereto a signal responsive to a characteristic of said reference signal corresponding to a relative orientation of said second sighting device in at least one plane in space with respect to said orientation in said at least one plane of said first sighting device, said characteristic other than information-bearing data containing said orientation in space of said first sighting device encoded on said reference signal, said relative orientation processing unit determining from said signal from said receiver and said signal from said at least one orientation sensor a relative orientation in space of said second sighting device with respect to an orientation in space of said first sighting device, said second sighting device further including an indicator coupled to said relative orientation processing unit for indicating a direction in which to direct said second sighting axis so as to be aligned on the common target object.

34. The system for aligning independently oriented sighting devices toward a common target object as recited in claim 33, wherein said orientation corresponding to said characteristic of said reference signal is defined in two orthogonal planes in space, said orientation sensor being mechanically coupled to said second sighting device such that said corresponding plane is orthogonal to said two orthogonal planes.

35. The system for aligning independently oriented sighting devices toward a common target object as recited in claim 33, wherein said second sighting device includes two orientation sensors each respectively operable to determine an orientation of said second sighting device in a corresponding single plane in space relative to a predetermined orientation in said corresponding plane, each of said corresponding planes being mutually orthogonal one with the other, said orientation in space as determined from said characteristic of said reference signal being defined in a single plane in space, said two orientation sensors being mechanically coupled to said second sighting device such that said mutually orthogonal planes are orthogonal to said single plane corresponding to said characteristic of said reference signal.

36. The system for aligning independently oriented sighting devices toward a common target object as recited in claim 33, wherein said reference signal includes a carrier and a modulated carrier envelope.

37. The system for aligning independently oriented sighting devices toward a common target object as recited in claim 36, wherein said characteristic of said reference signal is channel traversal time of said modulated carrier envelope.

38. The system for aligning independently oriented sighting devices toward a common target object as recited in claim 36, wherein said characteristic of said reference signal is a phase difference of said carrier at predetermined locations on said second sighting device.

39. The system for aligning independently oriented sighting devices toward a common target object as recited in claim 36, wherein said reference signal further includes a data carrying component.

40. The system for aligning independently oriented sighting devices toward a common target object as recited in claim 39, wherein said data of said data carrying component includes an indication of a time of transmission of said modulated carrier envelope of said reference signal.

41. The system for aligning independently oriented sighting devices toward a common target object as recited in claim 36, wherein component signals of said reference signal are conveyed over separate transmission channels.

42. The system for aligning independently oriented sighting device toward a common target object as recited in claim 41, wherein said carrier and said modulated carrier envelope are conveyed in a first transmission channel and a data carrying component of said reference signal is carried in a second transmission channel.

43. The system for aligning independently oriented sighting devices toward a common target object as recited in claim 42, wherein a pulse modulated acoustic wave is conveyed in said first transmission channel and an electromagnetic signal is conveyed in said second transmission channel.

44. The system for aligning independently oriented sighting devices toward a common target object as recited in claim 43, wherein said data carrying component includes an indication of a time of transmission of said modulated carrier envelope of said reference signal.

45. The system for aligning independently oriented sighting devices toward a common target object as recited in claim 44, wherein said second channel is established in a transmission medium separate from said first channel.

46. The system for aligning independently oriented sighting devices toward a common target object as recited in claim 33, wherein said characteristic of said reference signal is a state of polarization thereof, said receiver including a polarization detection unit, said relative orientation processing unit determining said relative orientation in space of said second sighting device from a signal produced by said polarization detection unit responsive to said state of polarization of said reference signal.

47. The system for aligning independently oriented sighting devices toward a common target object as recited in claim 46, wherein said polarization detection unit includes a plurality of polarization detectors, said signal produced by said polarization detection unit corresponding to relative signal strength from each said polarization detectors responsive to said state of polarization of said reference signal thereon.

48. The system for aligning independently oriented sighting devices toward a common target object as recited in claim 46, where said polarization detection unit includes a polarization detector mounted on a steerable platform, said steerable platform operable to adjust an orientation of said polarization detector so as to align said state of polarization of said reference signal therewith.

49. The system for aligning independently oriented sighting devices toward a common target object as recited in claim 33, wherein said characteristic of said reference signal is an angle of incidence thereof on said receiver, said receiver including an angle determining unit for determining said angle of incidence, said relative orientation processing unit determining said relative orientation of space of said second sighting device from a signal produced by said angle determining unit responsive to said angle of incidence on said receiver.

50. The system for aligning independently oriented sighting devices toward a common target object as recited in claim 49, wherein said reference signal includes a plurality of signal components, each of said signal components carried in a separate transmission channel.

51. The system for aligning independently oriented sighting devices toward a common target object as recited in claim 50, wherein said reference signal includes a first pulse modulated signal conveyed over a first transmission channel and a second pulse modulated signal conveyed over a second transmission channel, a transmission time of said first pulse modulated signal temporally separated from a transmission time of said second pulse modulated signal corresponding to an angular displacement of said first sighting device relative to said second sighting device, said angle determining unit determining said angle of incidence by a time of arrival of a pulse received over said first transmission channel relative to a time of arrival of a pulse received over said second transmission channel.

52. The system for aligning independently oriented sighting devices toward a common target object as recited in claim 50, wherein said reference signal includes a first component signal conveyed over a first transmission channel and a second component signal conveyed over a second transmission channel, a transmitted phase of said first component signal coinciding with a transmitted phase of said second component signal, said angle determining unit determining said angle of incidence by a difference in phase between said first component signal received over said first transmission channel and said second component signal received over said second transmission channel.

53. The system for aligning independently oriented sighting devices toward a common target object as recited in claim 50, wherein said reference signal includes a first component signal conveyed over a first transmission channel and a second component signal conveyed over a second transmission channel, said angle determining unit including a receiving aperture and a detector array, said detector array producing a signal responsive to a location of said reference signal incident thereon, said angle determining unit determining said angle of incidence by a location on said detector array of said first component signal as received through said receiving aperture and a location on said detector array of said second component signal as received through said receiving aperture.

54. The system for aligning independently oriented sighting devices toward a common target object as recited in claim 33, wherein said second sighting device further includes parallax compensating means operable on said characteristic of said reference signal to indicate via said indicator means said aiming direction when a distance to the common target object is such that said sighting axis of said second sighting device is not substantially parallel to said sighting axis of said first sighting device when both first and second sighting devices are aligned on the common target object.

55. A method for directing respective sighting axes of independent optical sighting devices towards a common target object, the method comprising the steps of:
orientating a first optical sighting device so that the common target object is at a predetermined location in a viewing port thereof;
forming an image representation of a view in said viewing port of said first optical sighting device;
extracting features from said image representation;
communicating characteristics of said features to a second optical sighting device;
indicating locations of said features in a viewing port of said second optical sighting device; and
rotating said second optical sighting device in accordance with said locations of said features in said viewing port thereof until the common target object is located in said predetermined location in said viewing port of said second optical sighting device.

* * * * *